United States Patent
Liu et al.

(10) Patent No.: US 12,377,870 B2
(45) Date of Patent: Aug. 5, 2025

(54) SYSTEMS AND METHODS FOR IMPROVED AND EXPANDED AUTONOMOUS VEHICLE OPERATION

(71) Applicant: Uber Technologies, Inc., San Francisco, CA (US)

(72) Inventors: Yifan Liu, Dublin, CA (US); Anirudh Srinivas, Seattle, WA (US); Nathan Falk, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 710 days.

(21) Appl. No.: 17/142,737

(22) Filed: Jan. 6, 2021

(65) Prior Publication Data

US 2022/0194415 A1    Jun. 23, 2022

Related U.S. Application Data

(60) Provisional application No. 63/129,236, filed on Dec. 22, 2020.

(51) Int. Cl.
| | |
|---|---|
| *B60W 60/00* | (2020.01) |
| *G06F 16/9035* | (2019.01) |
| *G06F 16/9038* | (2019.01) |
| *G06V 20/56* | (2022.01) |

(52) U.S. Cl.
CPC ....... *B60W 60/001* (2020.02); *G06F 16/9035* (2019.01); *G06F 16/9038* (2019.01); *G06V 20/588* (2022.01); *B60W 2552/53* (2020.02)

(58) Field of Classification Search
CPC ............. B60W 60/001; B60W 2552/53; G06F 16/9035; G06F 16/9038; G06F 16/9024; G06V 20/588; G01C 21/3407; G01C 21/3446; G06Q 10/04; G06Q 50/30
See application file for complete search history.

(56) References Cited

U.S. PATENT DOCUMENTS

| | | | | |
|---|---|---|---|---|
| 8,751,272 B1 * | 6/2014 | Seybold | ................. | G06Q 10/02 |
| | | | | 705/7.29 |
| 10,198,488 B2 * | 2/2019 | Marini | .................. | G06F 16/248 |
| 10,832,439 B1 * | 11/2020 | Ma | .......................... | G06V 20/58 |

(Continued)

*Primary Examiner* — Daniel L Greene
*Assistant Examiner* — Robert L Pinkerton
(74) *Attorney, Agent, or Firm* — Schwegman Lundberg & Woessner, P.A.

(57) ABSTRACT

A computer-implemented method for relaxing queries on a queried connection graph can include obtaining, by a computing system including one or more computing devices, a connected graph. The computer-implemented method can include evaluating, by the computing system, a first set of connected components of the connected graph with respect to a first query set. The first query set can include one or more query criteria. The query criteria can include one or more attributes associated with operating an autonomous vehicle. The computer-implemented method can include determining, by the computing system, one or more relaxed query sets based at least in part on the first query set. The computer-implemented method can include evaluating, by the computing system, a second set of connected components of the connected graph with respect to the one or more relaxed query sets, the connected graph being associated with autonomous vehicle operation within a geographic area.

20 Claims, 9 Drawing Sheets

(56) References Cited

U.S. PATENT DOCUMENTS

| | | | |
|---|---|---|---|
| 2005/0071325 A1* | 3/2005 | Bem | G06Q 30/02 |
| 2005/0080772 A1* | 4/2005 | Bem | G06F 16/951 |
| 2005/0234872 A1* | 10/2005 | Torge | G06F 16/2425 |
| 2006/0224562 A1* | 10/2006 | Yan | G16C 20/40 |
| 2008/0097968 A1* | 4/2008 | Delgado | G06F 16/36 |
| 2008/0208441 A1* | 8/2008 | Cheung | G08G 1/096866 |
| | | | 701/423 |
| 2010/0094673 A1* | 4/2010 | Lobo | G06Q 30/0256 |
| | | | 705/14.54 |
| 2011/0106420 A1* | 5/2011 | Nishibashi | G01C 21/3658 |
| | | | 434/150 |
| 2011/0112759 A1* | 5/2011 | Bast | G01C 21/3423 |
| | | | 701/533 |
| 2011/0295678 A1* | 12/2011 | Seldin | G06Q 30/0256 |
| | | | 705/14.42 |
| 2012/0246153 A1* | 9/2012 | Pehle | G06F 16/3322 |
| | | | 707/723 |
| 2013/0282696 A1* | 10/2013 | John | G06F 16/951 |
| | | | 707/E17.014 |
| 2013/0321400 A1* | 12/2013 | van Os | G06F 16/2291 |
| | | | 345/419 |
| 2014/0107921 A1* | 4/2014 | Delling | G01C 21/3446 |
| | | | 701/533 |
| 2016/0063037 A1* | 3/2016 | Savkli | G06F 16/532 |
| | | | 707/722 |
| 2016/0203130 A1* | 7/2016 | Roque | G06F 16/3344 |
| | | | 707/741 |
| 2017/0364534 A1* | 12/2017 | Zhang | G06F 16/284 |
| 2021/0042304 A1* | 2/2021 | Lei | G06F 16/2465 |
| 2021/0064620 A1* | 3/2021 | Namaki | G06F 16/90324 |
| 2022/0128989 A1* | 4/2022 | Ghorbanian-Matloob | |
| | | | G06V 20/58 |

* cited by examiner

SYSTEMS AND METHODS FOR IMPROVED AND EXPANDED AUTONOMOUS VEHICLE OPERATION

CROSS-REFERENCE TO RELATED APPLICATIONS

The present application claims filing benefit of U.S. Provisional Patent Application Ser. No. 63/129,236 having a filing date of Dec. 22, 2020, which is incorporated herein by reference in its entirety.

FIELD

The present disclosure relates generally to autonomous vehicles. more particularly, the present disclosure relates to systems and methods for improved and expanded autonomous vehicle operation.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for relaxing queries on a queried connection graph. The computer-implemented method can include obtaining, by a computing system including one or more computing devices, a connected graph. The computer-implemented method can include evaluating, by the computing system, a first set of connected components of the connected graph with respect to a first query set. The first query set can include one or more query criteria. The query criteria can include one or more attributes associated with operating an autonomous vehicle. The computer-implemented method can include determining, by the computing system, one or more relaxed query sets based at least in part on the first query set. The computer-implemented method can include evaluating, by the computing system, a second set of connected components of the connected graph with respect to the one or more relaxed query sets, the connected graph being associated with autonomous vehicle operation within a geographic area.

Another example aspect of the present disclosure is directed to a computer-implemented method for relaxing queries on a queried connected graph. The computer-implemented method can include obtaining, at a computing system including one or more computing devices, a connected graph. The computer-implemented method can include obtaining, by the computing system, a query relaxation request including a first query set and one or more relaxation parameters. The first query set can include one or more query criteria including one or more attributes associated with operating an autonomous vehicle. The computer-implemented method can include determining, by the computing system, at least one relaxed query set including one or more relaxed query criteria based at least in part on the one or more relaxation parameters. The computer-implemented method can include evaluating, by the computing system, a set of connected components from the connected graph based at least in part on the at least one relaxed query set, the connected graph being associated with autonomous vehicle operation within a geographic area.

Another example aspect of the present disclosure is directed to a computing system configured for relaxing queries on a queried connected graph. The computing system can include one or more processors and one or more memory devices storing computer-readable instructions that, when implemented, cause the one or more processors to perform operations for relaxing queries on a queried connected graph. The operations can include obtaining a connected graph. The operations can include evaluating a first set of connected components of the connected graph with respect to a first query set. The first query set can include one or more query criteria. The operations can include determining one or more relaxed query sets based at least in part on the first query set. The operations can include evaluating a second set of connected components of the connected graph with respect to the one or more relaxed query sets.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
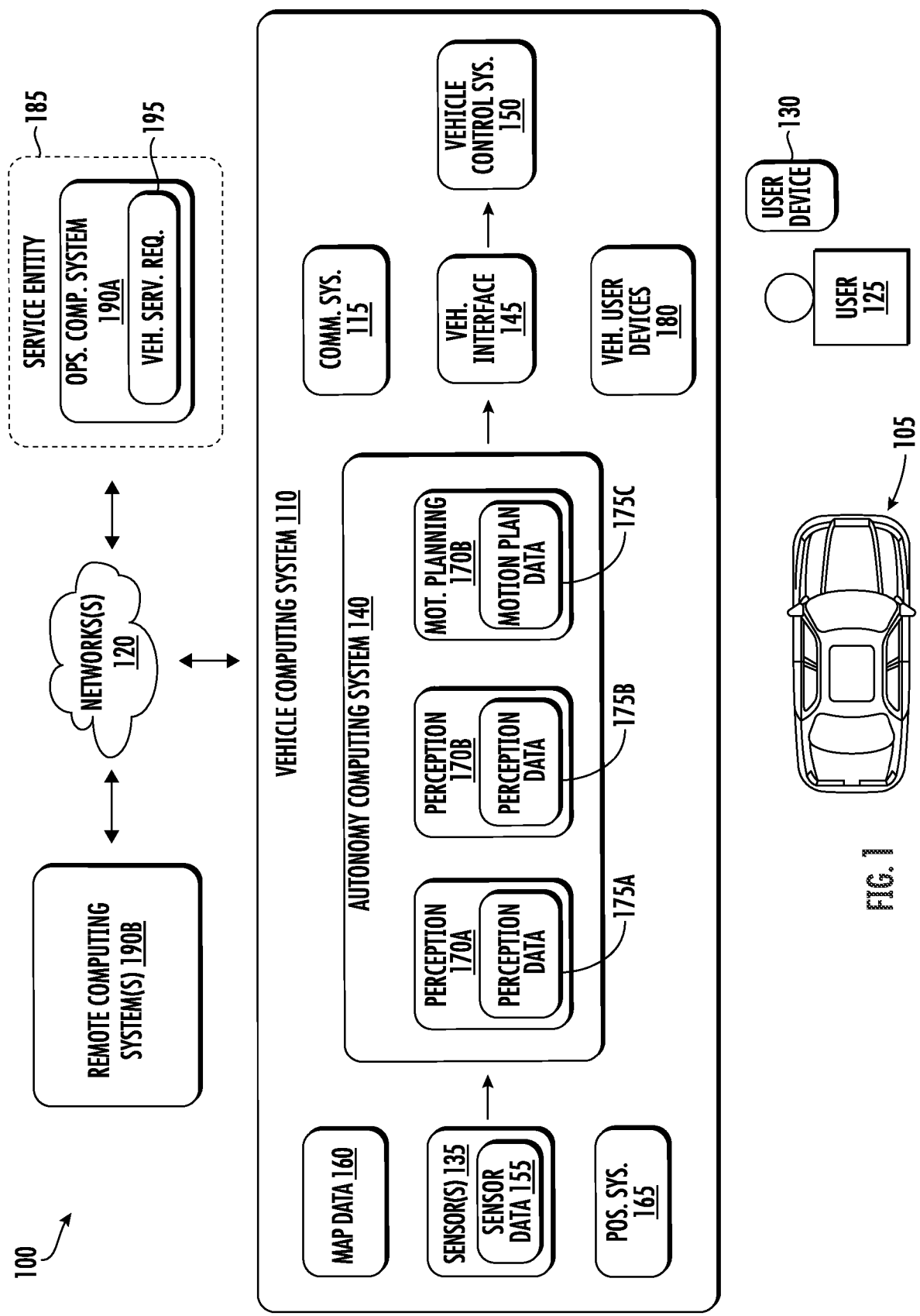
FIG. 1 depicts a block diagram of an example system for controlling and communicating with a vehicle according to example aspects of the present disclosure.

Example aspects of the present disclosure are directed to systems and methods for identifying query relaxations in a query to identify connected component(s) in a connected graph. Sensitivity analysis of a (e.g., user-defined) query of a connected graph can be useful for identifying query relaxations that provide an improvement to an objective. For example, systems and methods according to example aspects of the present disclosure can identify query relaxations to selected attributes of the connected component(s) found by a query (e.g., combination of characters, etc.) that provide an increased objective (e.g., size, such as mileage) of the connected component(s). The increased size can be, for instance, a maximum increased objective for a given number of attribute relaxations. Thus, systems and methods defined herein can identify attributes that may be relaxed to provide a maximum increase in objective. As one example, systems and methods according to example aspects of the present disclosure can identify attributes in a connected graph including one or more lanes (e.g., of road ways, sky routes, others travel ways) that provide an increased size of connected components. The relaxed attributes can be used to guide autonomous vehicle deployment and/or development. For instance, the relaxed attributes can be indicative of performance capabilities that may be improved for an autonomous vehicle to facilitate the autonomous vehicle navigating the region defined by the connected component(s).

The following describes the technology of this disclosure within the context of autonomous vehicles for example purposes only. As described herein, the technology described herein is not limited to autonomous vehicles and can be implemented within other robotic and computing systems, such as those utilized by ridesharing and/or delivery services.

A connected graph can be associated with autonomous vehicle operation within a geographic area. For example, in some cases, a region can be modeled as a connected graph including one or more lanes. As used herein, a "lane" refers to a navigable (e.g., drivable) segment, and can include road segments, aerial segments, paths, and other suitable navigable segments. For instance, in some implementations, each lane can be a node in the connected graph. Connectivity between the lanes can be modeled as edges in the graph. For instance, an edge can connect a first node (e.g., a first lane) to a second node (e.g., a second lane). As an example, in some implementations, the presence of an edge can be indicative that the first lane is in a connected relationship with the second lane. The connected relationship (e.g., the edges) may be one-way or unidirectional (e.g., as indicated by directed edges) and/or bidirectional. For instance, the presence of an edge may be indicative of a capability of a vehicle of navigating to the second lane from the first lane and/or from the first lane to the second lane.

Additionally, the connected graph can include, for each node, a set of attributes. The attributes can define characteristics of the node and/or the lane. For example, the attributes can define any suitable characteristics of the node and/or the lane, such as, for example, speed limit, number of drivable lanes, road closure status, road type, lane type (e.g., HOV, bus lane, bicycle lane, etc.), pavement type, construction status, and/or any other suitable characteristics. A selected subset of lanes can be filtered from the connected graph based on a query of the one or more attributes. For instance, the query can define one or more constraints, such as specified values of the attributes, and lane(s) satisfying the one or more constraints of the query can be included in the selected subset of lanes.

In particular, it can be desirable to identify one or more connected components in the connected graph that satisfy a query. As used herein, a connected component refers to a set or subset of a connected graph including a plurality of nodes and one or more edges, where each node in the connected component is reachable from every other node in the connected component by connections defined by the edge(s). For instance, a connected graph can be partitioned into one or more connected components that represent distinct regions of the graph. Connected component analysis (CCA) can be performed on a graph to identify the one or more connected components. Any suitable technique for connected component analysis can be employed in accordance with example aspects of the present disclosure.

As one example, in the context of navigation, connected component analysis with respect to a query defining specified path conditions (e.g., a speed limit threshold) can identify regions of a city, state, or other suitable mapped region that may be reachable and/or unreachable by a vehicle (e.g., an autonomous vehicle) capable of navigating according to the conditions of the query. For instance, the query conditions may be established with respect to operating constraints of an autonomous vehicle for user comfort, safety considerations, legality, or any other suitable consideration. As one example, a ride-sharing vehicle (e.g., an autonomous vehicle) may be prohibited from navigating along lanes not included in the connected component while providing a service (e.g., transporting a user and/or item, etc.). As another example, a ride-sharing vehicle (e.g., an autonomous vehicle) may only service lanes included in a (e.g., single) connected component.

In some cases, the connected graph can be sourced or generated from map data. For instance, the map data can include data descriptive of geographic features such as terrain, roads, buildings, paths, and/or other geographic features. Additionally and/or alternatively, the map data can include data descriptive of attributes of the geographic features such as, for example, speed limits, terrain information (e.g., gradients, etc.), lane types, and/or other suitable attributes. In some implementations, the connected graph can be the map data itself. Additionally and/or alternatively, the connected graph data can be derived from the map data.

In some implementations, the connected graph and/or connected components can be visualized using lane visualization software. The lane visualization software may be configured to display lanes. For instance, in some implementations, a frontend component at a computing device can be configured to receive the connected graph, map data, and/or other data from a backend component (e.g., a computing system). The computing device (e.g., the frontend component) can display the connected graph as, for example, an overlay on and/or integrated into the map data. As one example, the frontend component can be or can include a user interface, such as a graphical user interface, that is configured to display, for example, connected graphs, connected components, lanes, query sets, query criteria, attributes, and/or various other information and/or data described herein. For instance, the one or more nodes corresponding to lanes may be displayed as road segments or other path indicia on a region map. The nodes may be shaped and/or oriented with respect to a lane or path corresponding to the node, such that the nodes visually resemble a map. In this way, a user of the frontend component can visualize and/or manipulate the connected graph to glean information about the connected graph.

Additionally and/or alternatively, the lane visualization software may provide (e.g., via one or more user interface elements) a user with the capability of performing a query to identify one or more connected components in the connected graph, such as by inputting one or more query criteria. Nodes included in a connected component may be visually distinguishable from nodes not included in the connected component. For example, nodes in each connected component may be displayed with a common color, style, etc. to other nodes in the connected component. In this manner, for example, a user can be provided with the capability of analyzing and interpreting connected components via a graphical user interface.

Connected component analysis can be (e.g., manually) performed with varying query conditions to search for query conditions that yield desirable results. For instance, a user may (e.g., manually) define query conditions and identify (e.g., by connected component analysis software) connected components based on the query conditions. However, manually searching for desirable query conditions can be challenging. For instance, a user may be presented with a variety of different query conditions, resulting in a search space that is challenging for a user to manually navigate. Additionally and/or alternatively, evaluating the query can be a computationally intensive process, especially for connected graphs spanning cities or larger regions, resulting in large computation times between queries. This can result in wasted user time and/or effort.

Example aspects of the present disclosure can provide for solutions to these and other challenges. Systems and methods according to example aspects of the present disclosure can provide for relaxing queries on a queried connection graph. For instance, systems and methods according to example aspects of the present disclosure can obtain (e.g., by a computing system including one or more computing devices) a connected graph. The connected graph can include a plurality of nodes and/or one or more edges. In some implementations, the connected graph can be or can include a lane map including one or more nodes corresponding to one or more lanes and one or more edges corresponding to connectiveness between the one or more lanes. For instance, in some implementations, the plurality of nodes can correspond to a plurality of lanes. Additionally and/or alternatively, the one or more edges can model connectivity between the plurality of lanes.

In some implementations, the plurality of nodes (e.g., the lanes) can include one or more attributes. The one or more attributes can define characteristics of the nodes (e.g., lanes). For instance, the one or more attributes of a node can define physical characteristics of a lane corresponding to the node. As example, the one or more attributes can include speed limit, number of traffic lanes, lane dimensions (e.g., width), gradient information (e.g., minimum gradient, maximum gradient, average gradient, etc.), usage type, presence of bus stops, bicycle lanes, street parking, or other infrastructure, lane direction, road type, number of intersections, and/or any other suitable attributes.

The connected graph can be queried (e.g., by connected component analysis) with respect to the attributes and one or more query criteria. For instance, connected component analysis can be performed to evaluate a set of connected components of the connected graph with respect to a given query set. The query set can be or can include a set of one or more query criteria or query conditions. The query criteria can define a criteria (e.g., one or more allowable values) for one or more attribute(s) associated with operating an autonomous vehicle. The criteria/attributes can be configured such that nodes satisfying (e.g., each of) the query criteria in a query set may be included in the connected components. For example, such as for numeric attributes (e.g., speed limit, gradient, etc.), the query criteria may define a threshold and/or range (e.g., minimum and/or maximum) of allowable values. As another example, such as for attributes having one or more values from a discrete list of values, the query criteria may define values from the discrete list that must be included and/or excluded from the attribute.

Example aspects of the present disclosure can provide for identifying relaxed query sets. The relaxed query set(s) can have one or more query conditions that are relaxed (e.g., broadened) compared to query conditions of a baseline query set. For instance, systems and methods according to example aspects of the present disclosure can evaluate (e.g., by the computing system) a first set of connected components of the connected graph with respect to a first query set. The first query set can include one or more query criteria. For instance, in some implementations, the first query set can be a baseline query set. The baseline query set can represent a current state of query criteria. As one example, the baseline query set may represent a user-defined query including query criteria that are (e.g., manually) input by a user. For example, the baseline query set may represent current operational conditions (e.g., operational constraints) of an autonomous vehicle, such as a ridesharing autonomous vehicle. For example, the operational conditions may represent current performance and/or other operational capabilities of the autonomous vehicle.

As one example, in some implementations, a user may manually input or otherwise retrieve the first query set at a frontend component, such as a user interface. As one example, the front end can provide (e.g., by one or more user interface components) a user with the capability of inputting one or more query criteria. After the user has input the query criteria, the frontend component may provide the user with the capability of initiating connected component analysis based on the input query criteria (e.g., the first query set) to evaluate and/or display the connected components corresponding to the input query criteria. For instance, the frontend component may send a query relaxation request to a backend component (e.g., a server/database component) to instruct the backend component to evaluate the connected components. The query relaxation request may include the query criteria of the first query set. In some implementations, the relaxed query sets and/or the second set of connected components may be returned (e.g., from the backend to the frontend) in addition to the connected components corresponding to the first query set.

In some implementations, the systems and methods according to example aspects of the present disclosure can provide for identifying (e.g., by the computing system) one or more candidate relaxed query sets based at least in part on the first query set. For instance, in some implementations, the candidate relaxed query sets can be determined with respect to one or more relaxation parameters. The relaxation parameters can be, for example, specified by a user. As one example, a relaxation parameter can be a cardinality of relaxed query criteria. For instance, the one or more candidate relaxed query sets can be identified with respect to a cardinality of relaxed query criteria. The cardinality can specify a maximum number of query criteria to be relaxed. For instance, valid relaxed query sets having a number of relaxed query criteria that is less than and/or equal to the cardinality may be identified as candidate relaxed query sets. The cardinality can be established based on likely improvements to vehicle capabilities in a reasonable future time frame. For example, it may be unlikely that vehicle capabilities will improve at greater than some number of attributes in the near future, and the cardinality may be selected to trim the search space to query sets corresponding reasonable improvements in capabilities over the near future. In some implementations, the cardinality can be user-specified. For instance, the cardinality may be input by a user into a graphical user interface, such as a frontend component, and/or provided from a user in a query relaxation request to a backend component to instruct the backend component on a number of query criteria to relax. The use of a cardinality can additionally and/or alternatively prevent trivial or unhelpful solutions, such as a solution to relax all query criteria or some large number of query criteria, which may be practically infeasible.

Additionally and/or alternatively, systems and methods according to example aspects of the present disclosure can provide for determining (e.g., by the computing system) one or more relaxed query sets based at least in part on the first query set. The relaxed query set(s) can include one or more query criteria. For instance, the relaxed query set(s) can include at least one relaxed query criteria. The relaxed query criteria can be relaxed or broadened respective to the (e.g., baseline) query criteria of the first query set. For instance, at least one of the query criteria (e.g., the relaxed query criteria) of the relaxed query set(s) can be broader than a respective query criteria of the first query set. For example, a number of values satisfying a relaxed query criteria can be greater than a number of values satisfying a (e.g., baseline) query criteria of the first query set. In some implementations, one or more of the query criteria can be locked query criteria that are not allowed to vary between the first query set and the relaxed query set. For instance, in some implementations, a user can lock certain query criteria or attributes.

As one example, such as for numerical query criteria, a range of allowable values for the relaxed query criteria can be broader than a range for a baseline query criteria. For example, in some implementations, a (e.g., numerical) relaxed query criteria can differ from a baseline criteria by a (e.g., fixed) step size. Relaxing query conditions by a step size can provide for a deterministic manner for relaxing an otherwise larger range of potential relaxations, such as for numerical values. For instance, the step size can specify an amount by which numerical query conditions are to differ when relaxed. In some implementations, a user may specify the step size, such as in a query relaxation request to the backend.

As another example, the relaxed query set may include a greater number of allowed tags and/or a fewer number of restricted tags for tag or token-based query criteria. Additionally and/or alternatively, the allowable values for the relaxed query criteria may include some or all allowable values of the baseline query criteria. For instance, if a baseline query includes one allowable tag or label, a relaxed query may include two (or more) allowable tags or label, including the originally allowable tag or label. In some implementations, the number of and/or types of newly allowable tags or labels in a relaxed query criteria may be specified (e.g., by the user).

Additionally and/or alternatively, systems and methods according to example aspects of the present disclosure can provide for evaluating (e.g., by the computing system) a second set of connected components of the connected graph with respect to the one or more relaxed query sets. For instance, for each of the identified relaxed query sets, a second set of connected components can be generated based on the relaxed query criteria of the relaxed query sets. Generally, the second set of connected components will include at least one connected component that is enlarged compared to a corresponding connected component of the original set of connected components. Additionally and/or alternatively, the second set of connected components may provide for some connected components to merge. Additionally and/or alternatively, the second set of connected components can provide for new connected components to be formed from nodes that may not have previously been included in any connected component.

In implementations with multiple second sets of connected components, the multiple second sets of connected components can be evaluated from a single backend request (e.g., query relaxation requests) and/or multiple backend requests. For example, in some implementations, a single backend request can be provided to the backend, and the backend can generate a superset of all valid relaxed query sets and/or lanes. The supersets can then be filtered for the first query set and each relaxed query set. This approach can reduce computational overhead associated with providing the backend request, which can improve processing time in some cases. Additionally and/or alternatively, in some implementations, each backend request can provide a single relaxed query set and/or second set of connected components. For instance, each backend request can cause a second set of connected components and/or corresponding relaxed query set to be evaluated and/or stored, such as in a database.

As one example, in some implementations, the second set(s) of connected components can be evaluated by a so-called brute force technique. For instance, a second set of connected components can be evaluated for each valid relaxed query set (e.g., satisfying the desired cardinality). The most improved relaxed query set(s) and/or corresponding second sets of connected components may then be provided to a user.

Additionally and/or alternatively, in some implementations, improvement of some or all of the relaxed query sets can be scored by an approximation algorithm. For instance, in some implementations, determining the relaxed query sets can include identifying (e.g., by the computing system) one or more candidate relaxed query sets based at least in part on the first query set. For instance, in some implementations, the one or more candidate relaxed query sets can be or can include (e.g., each) query set that satisfies the cardinality of relaxed attributes. Determining the relaxed query sets can further include scoring (e.g., by the computing system) the one or more candidate relaxed query sets to produce one or more candidate scores relative to the one or more candidate relaxed query sets. For instance, the candidate scores can be indicative of an approximated objective (e.g., size) and/or increase in objective (e.g., a marginal increase) of a respective candidate relaxed query sets.

Mathematically, let Q' be a relaxation of an original query set Q. The original query set Q can include one or more query criteria $q(l, a_i, v_i)$. The additional nodes enabled by this relaxation are $V^{Q'} = \{l \in V \setminus V(Q): q(l, a_i, v_i) = 1 \ \forall i \in Q'\}$, e.g., the set of nodes filtered out by the original query but enabled by the relaxation. As used herein, let l denote a lane or node, let $a_i$ denote an attribute, and let $v_i$ denote a queried value.

As one example, in some implementations, the candidate score(s) can be or can include, for a respective candidate relaxed query set, a count of each node in the connected graph that is added to an existing connected component by querying according to the candidate relaxed query set. For instance, in some implementations, this score can be determined by determining a number of nodes that have predecessors or successors in a set including all new nodes provided by the candidate relaxed query sets $V^{Q'}$. For example, let p(l) and s(l) denote the set of predecessors and successors of node l. Then, this score can be expressed as:

$$s_1(Q') = \sum_{l \in V^{Q'}} \mathbb{1}[(p(l) \cup s(l)) \cap C_G(Q) \neq \emptyset]$$

Additionally and/or alternatively, in some implementations, the candidate score(s) can be or can include, for a respective candidate relaxed query set, a count of each node in the connected graph that forms a new connected component by querying according to the candidate relaxed query set. This score can be expressed as:

$$s_2(Q') = \sum_{l \in V^{Q'}} \mathbb{1}[(p(l) \cup s(l)) \cap V^{Q'} \neq \emptyset]$$

The candidate score(s) can, in some implementations, be a sum of these two counts. For instance, a candidate score can be expressed as:

$$s(Q') = \alpha s_1(Q') + \beta s_2(Q')$$

where $\alpha$ and $\beta$ denote scaling factors. This candidate score can positively correlate to size of the connected components, and can thus serve as a suitable approximation for identifying query relaxations that greatly increase a size objective of the connected components.

Determining the relaxed query sets can further include selecting (e.g., by the computing system) the one or more relaxed query sets from at least a subset of the one or more candidate relaxed query sets based at least in part on the one or more candidate scores. For instance, in some implementations, the relaxed query set(s) can be selected as a subset of candidate relaxed query sets having the highest candidate score(s). Once the subset is identified and selected, sets of connected components can be generated (e.g., only) for the selected subset.

In some implementations, systems and methods according to example aspects of the present disclosure can provide for displaying (e.g., by the computing system) the second set of connected components and/or the relaxed query set(s). For example, in some implementations, the relaxed query criteria may be rendered in a list. If the user hovers over each list item, the second set of connected components corresponding to the relaxed query criteria (e.g., the added lanes) can be shown (e.g., highlighted) in a frontend component, such as a user interface, such as on a map.

Systems and methods according to example aspects of the present disclosure can provide for a number of technical effects and benefits, including improvements to computing technology. For instance, systems and methods according to example aspects of the present disclosure can provide systems for identifying query relaxations that provide a set of connected components that improves an objective of the connected components (e.g., size of the connected components) with respect to an original query. The query relaxations (e.g., the attributes that are relaxed) can be indicative of performance parameters and/or operational constraints (e.g., of vehicles such as autonomous vehicles) that may be improved and/or relaxed to increase an available range of service of a vehicle (e.g., an autonomous vehicle). The increased available range of service can contribute to shorter ride times, increased user engagement, increased availability of ride-sharing services, more efficient trip planning, and/or targeted vehicle development (e.g., autonomous vehicle development). Additionally and/or alternatively, systems and methods according to example aspects of the present disclosure can guide ride-sharing vehicle (e.g., autonomous vehicle) deployment, such as by providing for visualizing connected components corresponding to operational regions.

Additionally and/or alternatively, systems and methods according to example aspects of the present disclosure can provide for improvements to computing technology. For instance, systems and methods according to example aspects of the present disclosure can provide an algorithmic approach to identifying attributes to be relaxed in a query. This can provide for automating identification of query relaxations. Additionally and/or alternatively, systems and methods according to example aspects of the present disclosure allow for the reduction of computing times associated with evaluating connected components of a plurality of candidate query sets by, for instance, scoring the candidate relaxed query sets to produce one or more candidate scores relative to the candidate relaxed query sets and selecting the one or more relaxed query sets from at least a subset of the one or more candidate relaxed query sets based at least in part on the one or more candidate scores. As an example, scoring the relaxed query sets and evaluating only the selected subset of relaxed query sets can avoid the relatively more computationally intensive task of evaluating a set of connected components for each candidate relaxed query sets. For instance, a search space of candidate relaxed query sets can be reduced to only a subset of highest-scoring relaxed query sets.

Various means can be configured to perform the methods and processes described herein. For example, a computing system can include data obtaining unit(s), query evaluating unit(s), query relaxing unit(s), data providing unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain a connected graph. For instance, the connected graph can include a lane map having one or more nodes corresponding to one or more lanes and one or more edges corresponding to connectiveness between the one or more lanes. Additionally and/or alternatively, the means (e.g., query evaluating unit(s), etc.) can be configured to evaluate a first set of connected components of the connected graph with respect to a first query set. The first query set can include one or more query criteria.

The means (e.g., query relaxing unit(s), etc.) can be configured to a obtain query relaxation request comprising a first query set and one or more relaxation parameters, the first query set comprising one or more query criteria. Additionally and/or alternatively, the means (e.g., query relaxing unit(s), etc.) can be configured to determine one or more relaxed query sets based at least in part on the first query set. Additionally and/or alternatively, the means (e.g., query evaluating unit(s), etc.) can evaluate a second set of connected components of the connected graph with respect to the one or more relaxed query sets.

The means (e.g., data providing unit(s), etc.) can provide data such as the first query set, the first set of connected components, the one or more relaxed query sets, and/or the second set of components. For instance, the means (e.g., data providing unit(s), etc.) can provide the data for display (e.g., via a display device).

Referring now to the FIGS., example aspects of the present disclosure will be discussed in greater detail.

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a light weight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally and/or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle (e.g., according to operational constraints, such as those corresponding to query criteria), communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector(s) (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of image capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments (e.g., lanes), buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.), operational restrictions; and/or any other map data that provides information (e.g., lane attributes) that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, Wi-Fi access points, etc.) and/or other suitable techniques. The position of the vehicle 105 can be used by various systems of the vehicle computing system 110 and/or provided to a remote computing system. For example, the map data 160 can provide the vehicle 105 with relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 130 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that are within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C. The motion plan may satisfy certain operational constraints limiting potential actions taken by the vehicle.

The motion planning system 180 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein matching users and vehicles/vehicle fleets, deploying vehicles, facilitating the provision of vehicle services via autonomous vehicles, etc. Additionally and/or alternatively the operations computing system may include endpoints for connected component analysis as described herein.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 194 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2:
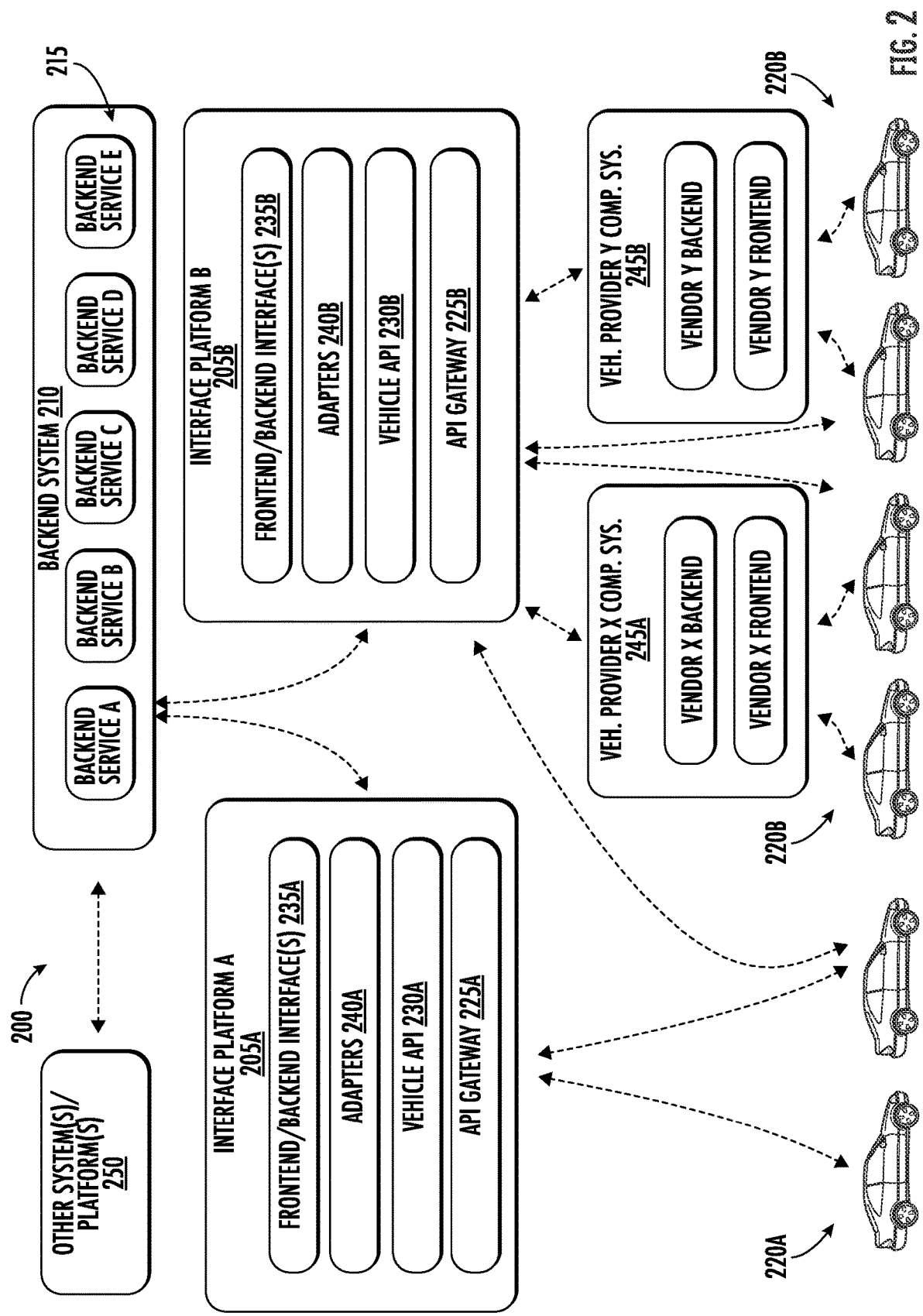
FIG. 2 depicts an example service infrastructure according to example embodiments of the present disclosure.

FIG. 2 depicts an example service infrastructure 200 according to example embodiments of the present disclosure. The service infrastructure 200 can include one or more systems, interfaces, and/or other components that can be included in an operations computing systems of the service entity for coordinating vehicle services and managing/supporting the autonomous vehicle associated therewith. The service infrastructure 200 can represent, for example, the architecture of a service platform of the operations computing system for coordinating and providing one or more vehicle services (e.g., via autonomous vehicle(s), etc.).

The service infrastructure 200 of an operations computing system can include a first application programming interface platform 205A, a second application programming interface application platform 205B, and/or a backend system 210 with one or a plurality of backend services 215. These components can allow the service infrastructure 200 (e.g., the operations computing system) to communicate with one or more autonomous vehicles and/or one or more other systems.

The first application programming interface platform 205A can facilitate communication with one or more autonomous vehicles of the service entity. For example, as described herein, the service entity may own, lease, etc. a fleet of autonomous vehicles 220A that can be managed by the service entity (e.g., its backend services) to provide one or more vehicle services. The autonomous vehicle(s) 220A can be utilized by the service entity to provide the vehicle service(s) and can be included in the fleet of the service entity. Such autonomous vehicle(s) may be referred to as "service entity autonomous vehicles" or "first party autonomous vehicles."

The first application programming interface platform 205A can include a number of components to help facilitate the support, coordination, and management of the first party autonomous vehicles 220A associated with the service entity. The first application programming interface platform 205A (e.g., a private platform, etc.) can provide access to one or more backend services 215 that are available to the first party autonomous vehicles 220A. To help do so, the first application programming interface platform 205A can include a first API gateway 225A. The first API gateway 225A can function as a proxy for application programming interface (API) calls and can help to return an associated response. The first API gateway 225A can help provide other support functions for the service infrastructure 200 such as, for example, authentication functions, etc.

The first application programming interface platform 205A can include one or more APIs such as, for example, a first vehicle API 230A. The vehicle API 230A can include a library and/or parameters for facilitating communications between the first party autonomous vehicles 225A and the backend service(s) 215 of the backend system 210. For example, the first vehicle API 230A can be called by a first party autonomous vehicle 220A and/or another system (e.g., system(s)/platform(s) 250) to help communicate data, messages, etc. to and/or from an autonomous vehicle and/or another system (e.g., system(s)/platform(s) 250). The first vehicle API 230A can provide for communicating such information in a secure, bidirectional manner that allows for expanded processing of data offboard a vehicle, analyzing such data in real time, and/or the like.

The first application programming interface platform 205A can include first frontend/backend interface(s) 235A. Each first frontend/backend interface 235A can be associated with a backend service 215 of the backend system 210. The first frontend/backend interface(s) 235A can serve as interface(s) for one client (e.g., an external client such as a first party autonomous vehicle 220A) to provide data to another client (e.g., a backend service 215). In this way, the frontend/backend interface(s) 235A can be external facing edge(s) of the first application programing interface platform 205A that are responsible for providing secure tunnel(s) for first party autonomous vehicles 220A (and/or other system(s)/platform(s) 250) to communicate with the backend system 215 (and vice versa) so that a particular backend service can be accessed by a particular first party autonomous vehicle 220A (and/or other system(s)/platform(s) 250).

In some implementations, the first application programing interface platform 205A can include one or more first adapters 240A, for example, to provide compatibility between one or more first frontend/backend interfaces 235A and one or more of the API(s) associated with the first application programming interface platform 205A (e.g., vehicle API 230A). The first adapter(s) 240A can provide upstream and/or downstream separation between particular infrastructure components, provide or assist with data curation, flow normalization and/or consolidation, etc.

The second application programming interface platform 205B (e.g., a public platform, etc.) can facilitate communication with one or more autonomous vehicles of a third party vehicle provider. As described herein, a third party vehicle provider can be an entity that makes one or more of its autonomous vehicles available to the service entity for the provision of vehicle services. This can include, for example, an individual, an original equipment manufacturer (OEM), a third party vendor, or another entity that places its autonomous vehicle(s) online with the service platform of the service entity such that the autonomous vehicle(s) can provide vehicle services of the service entity. These autonomous vehicles may be referred to as "third party autonomous vehicles" and are shown in FIG. 2 as third party autonomous vehicles 220B. Even though such autonomous vehicles may not be included in the fleet of autonomous vehicles of the service entity, the service infrastructure 200 (e.g., of the service entity's service platform, etc.) can allow the third party autonomous vehicles 220B to provide vehicle services offered by the service entity, access the one or more backend services 215 of the backend system 210, etc.

The second application programming interface platform 205B can allow the service platform to communicate directly or indirectly with autonomous vehicle(s). In some implementations, a third party autonomous vehicle 220B may call an API of, send data/message(s) to, receive data/message(s) from/directly through, etc. the second application programming interface platform 205B.

Additionally, or alternatively, another computing system can serve as an intermediary between the third party autonomous vehicles 220B and the second application programming interface platform 205B (and the service platform associated therewith). For example, the service infrastructure 200 can be associated with and/or in communication with one or more third party vehicle provider computing systems 245, such as a vehicle provider X computing system and a vehicle provider Y computing system. Each third party vehicle provider X, Y can have its own, separate third party autonomous fleet including respective third party autonomous vehicles 220B. The third party vehicle provider computing systems 245 can be distinct and remote from the service infrastructure 200 and provide for management of vehicles associated with that particular third party vehicle provider. As shown in FIG. 2, a third party vehicle provider computing system 245 can include its own backends and/or frontends for communicating with other systems (e.g., third party autonomous vehicle(s) 220B, operations computing system, etc.).

The third party computing system 245 associated with a particular third party autonomous vehicle fleet can serve as the communication intermediary for that fleet. For example, third party autonomous vehicles 220B associated with third party vehicle provider X can communicate with the third party vehicle provider X computing system 245A which can then communicate with the service infrastructure 200 (e.g., to access the available backend services 215) via the second application programming interface platform 205B. Data from the service infrastructure 200 (e.g., the backend services 215) can be communicated to the vehicle provider X computing system 245A (e.g., via the second application programming interface platform 235B) and then to the third party autonomous vehicles 220B associated with third party vehicle provider X. In another example, third party autonomous vehicles 220B associated with third party vehicle provider Y can communicate with the third party vehicle provider Y computing system 245B which can then communicate with the service infrastructure 200 (e.g., to access the available backend services 215) via the second application programming interface platform 205B. Data from the service infrastructure 200 (e.g., the backend services 215) can be communicated to the third party vehicle provider Y computing system 245B (e.g., via the second application programming interface platform 205B) and then to the third party autonomous vehicles 220B associated with third party vehicle provider Y.

The second application programming interface platform 205B can include a number of components to help facilitate the support, coordination, and management of the third party autonomous vehicles 220B associated with the third party vehicle providers. The second application programming interface platform 205B can provide access to one or more backend services 215 that are available to the third party autonomous vehicles 220B. To help do so, the second application programming interface platform 205B can include a second API gateway 225B. The second API gateway 225B can function as a proxy for application programming interface (API) calls and can help to return an associated response. The second API gateway 225B can help provide other support functions for the service infrastructure 200 such as, for example, authentication functions, etc.

The second application programming interface platform 205B can include one or more APIs such as, for example, a second vehicle API 230B. The second vehicle API 230B can include a library and/or parameters for facilitating communications between the third party autonomous vehicles 220B and the backend service(s) 215 of the backend system 210. For example, the second vehicle API 230B can be called by a third party autonomous vehicle 220B and/or another system (e.g., a third party vehicle provider computing system 245, etc.) to help communicate data, messages, etc. to and/or from an autonomous vehicle. The second vehicle API 230B can provide for communicating such information in a secure, bidirectional manner.

The second application programming interface platform 205B can include second frontend/backend interface(s) 235B. Each of the second frontend/backend interface(s) 235B can be associated with a backend service 215 of the backend system 210. The second frontend/backend interface(s) 235B can serve as interface(s) for one client (e.g., an external client such as a third party autonomous vehicle 220B, a third party vehicle provider computing system 245) to provide data to another client (e.g., a backend service 215). In this way, the second frontend/backend interface(s) 235B can be external facing edge(s) of the second application programing interface platform 205B that are responsible for providing secure tunnel(s) for third party autonomous vehicles 220B (and/or other intermediary systems) to communicate with the backend system 210 (and vice versa) so that a particular backend service 215 can be utilized. In some implementations, the second application programing interface platform 205B can include one or more second adapters 240B, for example, to provide compatibility between one or more second frontend/backend interfaces 235B and one or more of the API(s) associated with the second application programming interface platform 205B (e.g., vehicle API 230B).

In some implementations, the first party autonomous vehicles 220A can utilize the second application programming interface platform 205B to access/communicate with the service platform/backend service(s) 215. This can allow for greater accessibility and/or back-up communication options for the first party autonomous vehicles 220A.

The backend system 210 can host, store, execute, etc. one or more backend services 215. The backend service(s) 215 can be implemented by system client(s), which can include hardware and/or software that is remote from the autonomous vehicles and that provide a particular service to an autonomous vehicle. The backend service(s) 215 can include a variety of services that help coordinate the provision of vehicle service(s) and support the autonomous vehicles and/or the third party vehicle providers performing/providing those vehicle service(s).

For example, the backend service(s) 215 can include a matching service that is configured to match an autonomous vehicle and/or an autonomous vehicle fleet with a service request for vehicle services. Based on a match, the matching service can generate and communicate data indicative of a candidate vehicle service assignment (indicative of the requested vehicle service) for one or more autonomous vehicles. In some implementations (e.g., for first party autonomous vehicle(s) 220A), the candidate vehicle service assignment can include a command that a first party autonomous vehicle 220A is required to accept, unless it would be unable to safely or fully perform the vehicle service. In some implementations (e.g., for third party autonomous vehicle(s) 220B), the candidate vehicle service assignment can include a request or offer for one or more autonomous vehicles to provide the vehicle service. The candidate vehicle service assignment can be communicated to one or more third party vehicle provider computing systems 245 and/or one or more autonomous vehicle(s) 220B (e.g., via the interface platform B 205B) and/or one or more autonomous vehicle(s) 220A (e.g., via the interface platform A 205A). The candidate vehicle service assignment can be accepted or rejected. If accepted, an autonomous vehicle 220A, 220B can be associated (e.g., assigned to service, etc.) with the vehicle service assignment. The vehicle service assignment can include data indicative of the user, a route, an origin location for the vehicle service, a destination location for the vehicle service, service parameters (e.g., time restraints, user accommodations/preferences, etc.), and/or any other information associated with a vehicle service.

The backend service(s) 215 can include an itinerary service. The itinerary service can be configured to maintain, update, track, etc. a data structure indicative of one or more task(s) and/or candidate task(s) associated with (and/or potentially associated with) a particular autonomous vehicle, autonomous vehicle fleet, and/or vehicle provider. The tasks can include, for example, vehicle service assignments for providing vehicle services and/or tasks associated with an activity other than the performance of a vehicle service. For example, the tasks can include: a testing task (e.g., for testing and validating autonomy software, hardware, etc.); a data acquisition task (e.g., acquiring sensor data associated with certain travel ways, etc.); a re-positioning task (e.g., for moving an idle vehicle between vehicle service assignments, to high demand areas, etc.); a circling task (e.g., for travelling within the current geographic area in which a vehicle is located (e.g., circle the block or neighborhood), etc.); a maintenance task (e.g., for instructing travel to a service depot to receive maintenance, etc.); a re-fueling task; a vehicle assistance task (e.g., where a vehicle travels to assist another vehicle, etc.); a deactivation task (e.g. going offline such that a vehicle, fleet of vehicles, or vehicle providers no longer accept service request, etc.); a parking task; and/or other types of tasks. The itinerary service can maintain an itinerary for an autonomous vehicle, fleet, vehicle provider, etc. The itinerary can serve as a queue for the various tasks. In some implementations, the tasks can be associated with a priority or order for which they are deployed to an autonomous vehicle, fleet, vehicle provider, etc.

In some implementations, the vehicle service assignment can be associated with a multi-modal vehicle service. For example, the user may request and/or be provided a multi-modal user itinerary by which the user is to travel to the user's ultimate destination via two or more types of transportation modalities (e.g., ground based vehicle, aerial vehicle, public transit, etc.). As such, the origin location and/or destination location identified in the vehicle service assignment may include intermediate locations (e.g., transfer points) along the user's multi-modal itinerary.

The backend service(s) 215 can include a deployment service that communicates tasks for an autonomous vehicle to complete. For example, the deployment service can communicate data indicative of a vehicle service assignment and/or another task to an autonomous vehicle (or an intermediary system). The deployment service can communicate such data to an autonomous vehicle (or an intermediary system) based at least in part on the itinerary associated therewith. By way of example, the highest priority task and/or the task that is next in order can be deployed.

The backend services 215 can include a routing service. The routing service can be configured to provide an autonomous vehicle with a route for a vehicle service and/or another task. The route can be based at least in part on factors associated with the geographic area in which the autonomous vehicle is (or will be) travelling (e.g., roadways, weather, traffic, events, etc.). Additionally, or alternatively, the route can be based at least in part the autonomy capabilities of the autonomous vehicle (e.g., ability to complete an unprotected left-hand turn, U-turn, etc.). In some implementations, the routing service can be configured to assign, coordinate, monitor, adjust, etc. one or more designated pick-up and/or drop-off zones for the vehicle service(s). The routing service can be available to first party autonomous vehicles 220A. In addition, or alternatively, the routing service can be available to third party autonomous vehicles 220B if permitted/requested by an associated third party vehicle provider.

The backend services 215 can include a rider experience service. The rider experience service can be configured to communicate data to a rider associated with the vehicle service. This can include, for example, upcoming vehicle actions, routes, drop-off zones, user adjustable vehicle conditions (e.g., music, temperature, etc.). Such information can be presented via a display device of an onboard tablet associated with an autonomous vehicle, a user device associated with the rider, etc. through a software application associated with the service entity.

The backend services 215 can include a remote assistance service. The remote assistance service can be configured to provide remote assistance to an autonomous vehicle and/or a user (e.g., a rider associated with the vehicle service, etc.). For example, a remote assistance operator can take over control of one or more vehicle operations and/or otherwise assist an autonomous vehicle during the one or more vehicle operations. By way of example, a remote assistance operator can remotely control the navigation of an autonomous vehicle to navigate the vehicle around/past an unexpected obstruction in a travel way (e.g., a fallen tree, etc.). In another example, the remote assistance operator can communicate with a user (e.g., via the onboard tablet, user's phone, etc.) in the event that the user is in need of help.

The backend services 215 can include a simulation/testing service. The simulation/testing service can help facilitate vehicle provider integration with the service platform. For example, simulation/testing service can provide testing environments for vehicle providers to simulate communications and/or the performance of vehicle services using the service infrastructure 200.

The backend services 215 can include one or more other services. This can include, for example, payment services, vehicle rating services, health and maintenance services, software update/deployment services, and/or other services.

In some implementations, one or more backend services 215 that are available to the first party autonomous vehicles 220A (e.g., via the first application programming interface platform 205A) may not be available to the third party autonomous vehicles 220B (e.g., via the second application programming interface platform 205B), and vice versa. For example, a software update/deployment service for the first party autonomous vehicles 220A may not be accessible or suitable for a third party autonomous vehicle 220B that utilizes the onboard autonomy software of a third party vehicle provider (not the service entity). As such, a software update/deployment backend service may not be able to communicate with a third party autonomous vehicle 220B and/or vice versa.

In some implementations, the service infrastructure 200 can include a test platform for validating and vetting end-to-end platform functionality, without use of a real vehicle on the ground. For example, the test platform can simulate trips with human drivers and/or support fully simulated trip assignment and/or trip workflow capabilities. For example, the test platform can simulate and monitor data traffic through the service infrastructure 200 to ensure proper functioning. In some implementations, the testing platform can access the simulation/testing backend to help facilitate a test or simulation.

In some implementations, the service infrastructure 200 can utilize a plurality of software development kits (SDKs) that help provide access to the first and second application programming interface platforms 205A, 205B. All (or a portion of) external communication with the platforms can be done via the SDKs. For example, the SDKs can include a first SDK (e.g., private SDK) and a second SDK (e.g., public SDK) and specific endpoints to facilitate communication with the first and second application programming interface platforms 205A, 205B, respectively. In some implementations, the first party autonomous vehicle(s) 220A (and/or a test platform) can use both the first and second SDKs, whereas the third party autonomous vehicles 220B and/or the third party vehicle provider computing systems 245 can use only the second SDK and associated endpoints. In some implementations, the SDKs can provide a single entry point, which can improve consistency across both the service provider fleet and the third party entity fleet(s). As an example, a second SDK can provide secured access to the second application interface platform 205B and access to capabilities such as vehicle service assignments, routing, and/or the like. The first SDK can be accessed by the first party autonomous vehicles 205A and provide access to capabilities including those available only to the first party autonomous vehicles 205A.

In some implementations, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service entity's services. For example, based on the authentication certificate, a command-line interface can determine which version of the SDK to which to provide access. In some implementations, SDKs can be implemented onboard a first or third party autonomous vehicle 220A, 220B and/or a third party vehicle provider computing system 245.

In some implementations, the service infrastructure 200 can facilitate communication between the service platform and one or more other system(s)/platform(s) 250 associated with the service entity/operations computing system. By way of example, the service entity may have (e.g., the operations computing system may include, etc.) one or more other system(s)/platform(s) 250 that can help indicate what services/vehicles are available to a user or other system, coordinate the provision of vehicle services by human-driven vehicles, and/or are specifically associated with certain types of services (e.g., delivery services, aerial transport services, etc.). The other system(s)/platform(s) 250 may communicate with the service platform utilizing the service infrastructure 200 (e.g., interface platform 205A, etc.) to determine, for example, whether any autonomous vehicles would be available to the user for any potential vehicle services.

Figure 3:
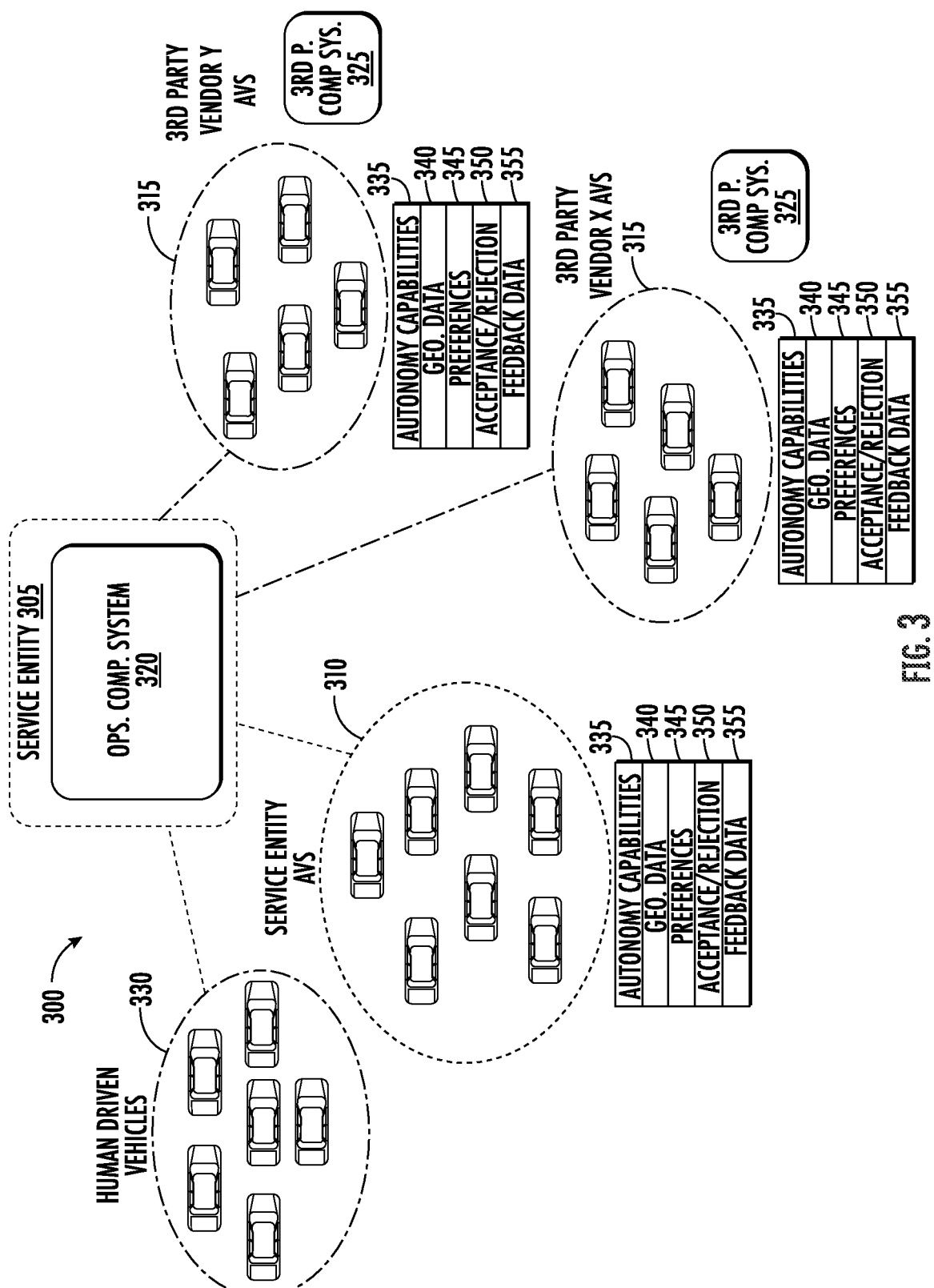
FIG. 3 depicts an example ecosystem of vehicles according to example embodiments of the present disclosure.

FIG. 3 depicts an example ecosystem 300 of vehicles according to example embodiments of the present disclosure. The ecosystem 300 can include vehicles associated with one or more vehicle providers including, for example, a service entity 305, a third party vehicle provider, an individual (e.g., owning/leasing a human driven vehicle), etc. A service entity 305 can utilize a plurality of autonomous vehicles including, but not limited to, service entity/first party autonomous vehicles 310 and/or third party autonomous vehicles 315 (e.g., third party vehicle provider X autonomous vehicle, third party vehicle provider Y autonomous vehicles, etc.) to provide vehicle services. An autonomous vehicle 310, 315 can be included in one or more fleets. A fleet can include one or a plurality of autonomous vehicles. The service entity 305 can be associated with a first computing system such as, for example, an operations computing system 320 (e.g., implementing the service infrastructure, service platform, etc.). The operations computing system 320 of the service entity 305 can help coordinate, support, manage, facilitate, etc. the provision of vehicle service(s) by the autonomous vehicles 310, 315. For instance, the vehicle service(s) can be provided based on operational constraints of the vehicle(s) 310, 315 based on, for example, attributes of an operational area (e.g., lanes) The service entity 305, autonomous vehicles 310, 315, and operations computing system 320 can include/represent the service entities, autonomous vehicles, and operations computing systems discussed with reference to one or more other figures described herein.

Each third party vehicle provider (e.g., vendor X, vendor Y) can be associated with a respective second computing system such as, for example, a third party computing system 325. The third party computing system 325 can be configured to manage the third party autonomous vehicles 315 (e.g., of the associated fleet, etc.). A third party computing system 325 can manage the vehicle service assignments, other vehicle tasks, dispatch, maintenance, online/offline status, etc. of its associated third party autonomous vehicles 315. Each third party autonomous vehicle (or fleet of third party autonomous vehicles) can communicate with the operations computing system 310 of the service entity 305 directly and/or indirectly via a respective third party computing system 325, as described herein.

In some implementations, the service entity 305 can utilize human driven vehicles 330 for providing vehicle services for the service entity 301. For example, the operations computing system 310 can determine if a vehicle service would be better suited and/or preferable for a human driven vehicle 330 in comparison to an autonomous vehicle 310, 315.

A service entity 305 may have varying levels of control over the vehicle(s) that perform its vehicle services. In some implementations, a vehicle can be included in the service entity's dedicated supply of vehicles. The dedicated supply can include vehicles that are owned, leased, or otherwise exclusively available to the service entity (e.g., for the provision of its vehicle service(s), other tasks, etc.) for at least some period of time. This can include, for example, the first party autonomous vehicles 310. Additionally, or alternatively, this can include a third party autonomous vehicle 315 that is associated with a third party vehicle provider, but that is online only with that service entity (e.g., available to accept vehicle service assignments for only that service entity, etc.) for a certain time period (e.g., a few hours, a day, week, etc.).

In some implementations, a vehicle can be included in the service entity's non-dedicated supply of vehicles. This can include vehicles that are not exclusively available to the service entity. For example, a third party autonomous vehicle 315 that is currently online with two different service entities (e.g., concurrently online with a first service entity and a second service entity, etc.) so that the autonomous vehicle 315 may accept vehicle service assignment(s) from either service entity, may be considered to be part of a non-dedicated supply of vehicles. In some implementations, whether a vehicle is considered to be part of the dedicated supply or the non-dedicated supply can be based, for example, on an agreement between the service entity and a third party vehicle provider associated with that vehicle.

The operations computing system 320 can determine which autonomous vehicles are available for a vehicle service/vehicle service request. In some implementations, the available autonomous vehicles can include those that are currently online with the service entity 305 (e.g., actively engaged, logged in, etc. to a service platform/service entity infrastructure, etc.) and are not currently engaged in performance of a vehicle service, performance of a maintenance operation, and/or another task. In some implementations, the operations computing system 320 can determine the availability of an autonomous vehicle 310, 315 based at least in part on data indicating that the autonomous vehicle 310, 315 is online, ready to provide a vehicle service, etc. This can include, for example, data communicated directly from an autonomous vehicle 310, 315 and/or from another computing system (e.g., a third party computing system 325, etc.). In some implementations, the operations computing system 320 can monitor an autonomous vehicle 310, 315 (e.g., its progress along a route, when it comes online, etc.) to help determine whether the autonomous vehicle 310, 315 may be available to service a vehicle service request.

As described herein, each autonomous vehicle 310, 315 that is online with the service entity 301 can be associated with an itinerary. The itinerary can be a data structure (e.g., a list, table, tree, queue, etc.) that is stored and accessible via a backend service of the infrastructure 200 (e.g., an itinerary service, etc.). The itinerary can include a sequence of tasks for the autonomous vehicle. In some implementations, the operations computing system 320 can determine that a vehicle is (or is not) available to provide a vehicle service based at least in part on an associated itinerary.

The operations computing system 320 of the service entity 301 can obtain data indicative of one or more operational capabilities of an autonomous vehicle 310, 315. The operational capabilities can describe the autonomy capabilities 335 of the autonomous vehicle (and/or its associated fleet), geographic data 340 associated with autonomous vehicle 310, 315 (and/or its associated fleet), and/or other information. The autonomy capabilities 335 can be indicative of the capabilities of the autonomous vehicle to autonomously navigate/operate (e.g., while in a fully autonomous mode), the restrictions of an autonomous vehicle, scenarios in which the autonomous vehicle 310, 315 can/cannot operate, and/or other information descriptive of how an autonomous vehicle 310, 315 can or cannot autonomously operate. For instance, the autonomy capabilities 335 can indicate one or more vehicle motion maneuvers that the autonomous vehicle 310, 315 can or cannot autonomously perform (e.g., without human input, while in a fully autonomous mode). By way of example, the autonomy capabilities 335 can indicate whether the autonomous vehicle(s) 310, 315 in a particular fleet can perform a U-turn and/or whether the autonomous vehicle(s) 310, 315 are restricted from performing an unprotected left turn. In another example, the autonomy capabilities 335 can indicate that an autonomous vehicle 310, 315 is capable of operating in a respective traffic area (e.g., a high traffic area such as an urban setting, a minimal traffic area such as a rural setting, etc.) and/or one or a plurality of geographic fences/boundaries identifying where the autonomous vehicle can travel (e.g., based on the map data available to the autonomous vehicle, vehicle provider preferences, etc.). The geographic data 340 can be indicative of the past, present, and/or future location(s) of an autonomous vehicle 310, 315 (e.g., when it is available to provide a vehicle service, for re-positioning, etc.).

The operations computing system 320 can also, or alternatively, obtain other data associated with the autonomous vehicles 310, 315, their associated fleets, and/or third party vehicle providers. For example, the operations computing system 320 can obtain data indicative of one or more preferences 345 associated with an autonomous vehicle 310, 315 (e.g., preferred operating areas, preferred operating times, preferred users, etc.), acceptance/rejection data 350 indicative of a rejection or acceptance of a vehicle service assignment and/or other task (and/or history thereof), feedback data 355 (e.g., indicative of user ratings, routing feedback, etc.), and/or other data.

Figure 4A:
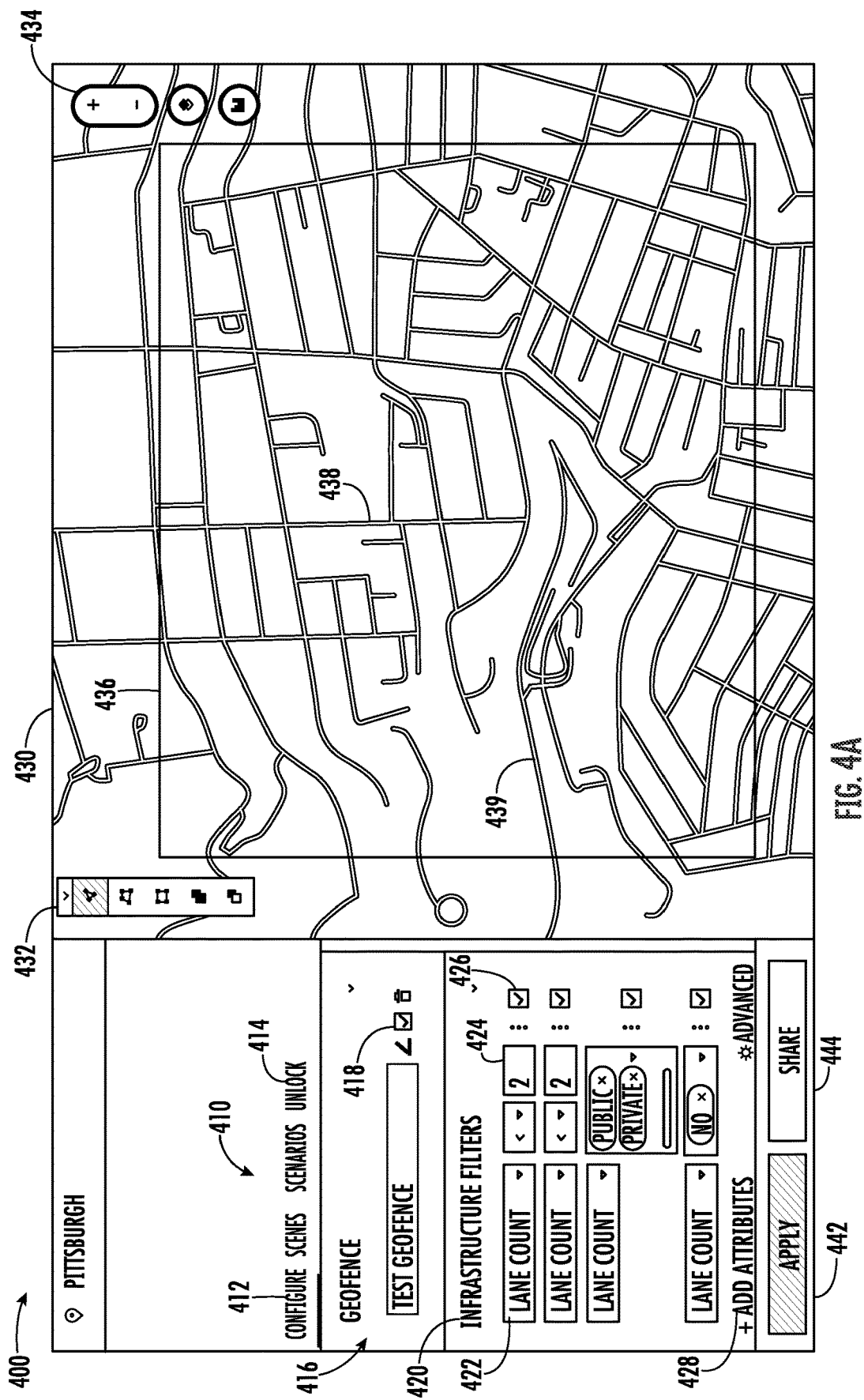
FIG. 4A depicts an example graphical user interface for querying a connected graph according to example embodiments of the present disclosure.
Figure 4B:
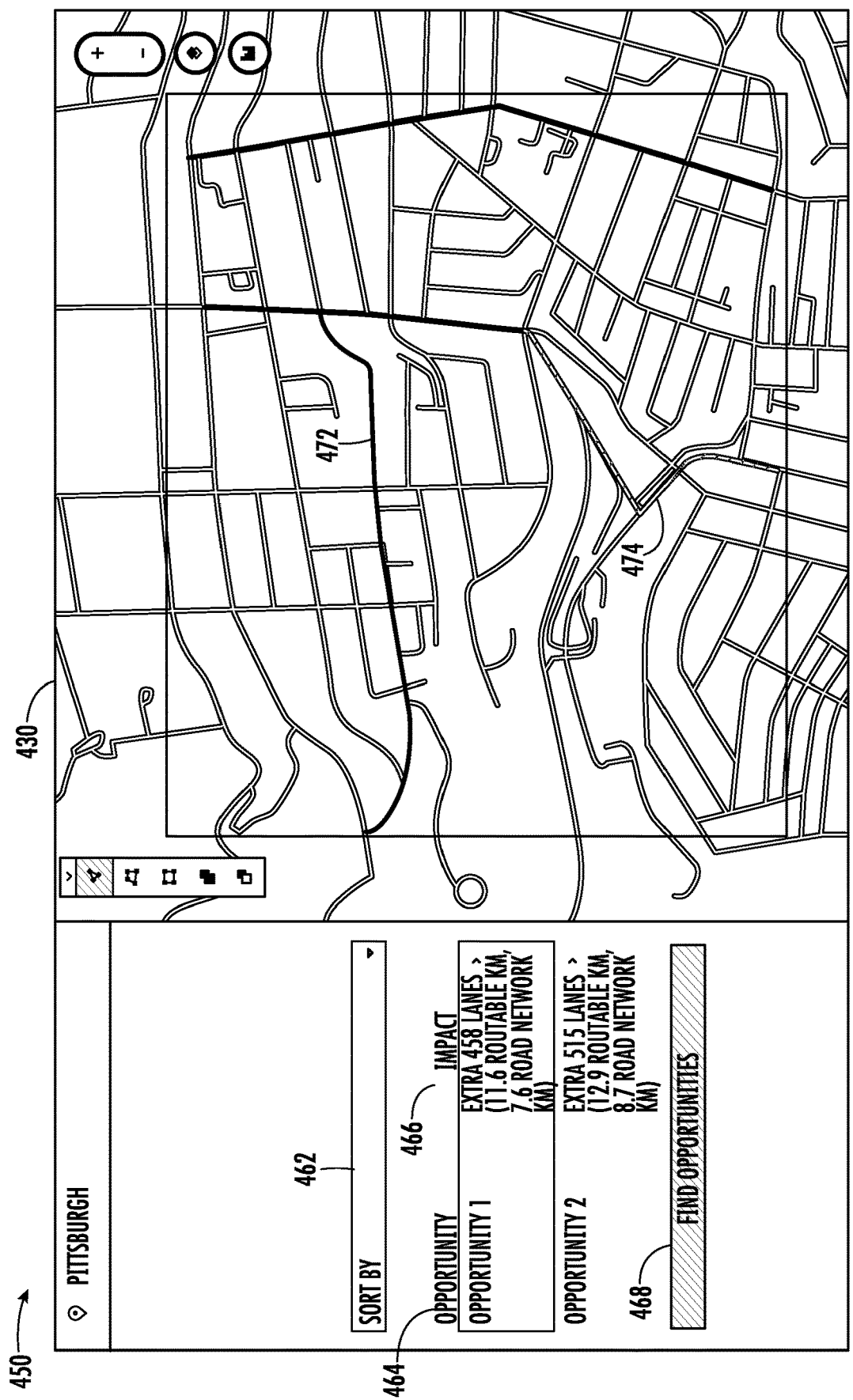
FIG. 4B depicts an example graphical user interface for displaying relaxed query sets and corresponding connected components according to example embodiments of the present disclosure.

FIG. 4A depicts an example graphical user interface 400 for querying a connected graph according to example embodiments of the present disclosure. The user interface 400 can include one or more tab elements 410. The tab elements 410 can allow a user to switch between a plurality of different views, such as a configure view (as illustrated in FIG. 4A) by interacting with configure tab 412 and a unlock view (as illustrated in FIG. 4B) by interacting with unlock tab 414. The configure view can provide a user with various options for viewing a connected graph in connected graph display element 430 and/or querying the connected graph by applying one or more query constraints to identify connected components in the connected graph that satisfy the query constraints. For instance, the user may be presented with view navigation elements 434. The user can interact with view navigation elements 434 to alter a user's perspective of the connected graph in connected graph display element 430. For example, interaction with the view navigation elements 434 can cause the connected graph to shift, zoom in or out, display more or less information (e.g., layers), etc.

The user can be provided with marking elements 432 to define markers, such as geofences, etc. on the connected graph display element 430. In some implementations, the user can define a geofence 436 to manually limit analyzed regions and/or operational regions (e.g., of an autonomous vehicle). For instance, the user can draw geofence 436 such that the connected component analysis is performed only for lanes (e.g., at least partially) contained by geofence 436. The geofences may be listed in geofence list 416. Geofence tools 418 can be provided to allow a user to edit, select/deselect, delete, or otherwise modify geofences.

The user interface 400 can additionally provide a user with query criteria list 420. The query criteria list 420 can provide for display one or more query criteria (e.g., of a first query set). Additionally and/or alternatively, the query criteria list 420 can provide for a user to edit, delete, input values for, and/or otherwise modify a query criteria. For instance, the query criteria list 420 can include (e.g., for each query criteria) a query criteria type element 422. The query criteria type element 422 can display and/or allow user input of (e.g., via text box, drop down list, etc.) a type of query criteria (e.g., corresponding to an attribute). Additionally and/or alternatively, the query criteria list 420 can provide value element 424. Value element 424 can provide for display and/or allow user input of allowable values of each query criteria and/or attribute. The query criteria list 420 can additionally provide checkboxes 426 to allow a user to enable/disable query criteria from being included in analysis (e.g., without clearing values of those query criteria). The user may be presented with add criteria element 428 that, when interacted with, provides for the inclusion of an additional query criteria in query criteria list 420. In some implementations, the user interface 400 can include share element 444 that, when interacted with, provides for a user to share, copy, or otherwise transfer the query criteria list 420, geofences (e.g., 430), connected graphs, and/or other suitable data of user interface 400.

The user interface 400 can additionally include apply element 442. The apply element 442, when interacted with, can cause the query criteria in query criteria list 420 to be applied and/or connected component analysis to be performed. For instance, when the query criteria are applied, lanes that do not satisfy the query criteria and/or are not included in a set of connected components, such as lanes 439, may be deselected, grayed out, or otherwise visually distinguished from those lanes that are included in the set of connected components satisfying the query criteria, such as lanes 438.

FIG. 4B depicts an example graphical user interface 450 for displaying relaxed query sets and corresponding connected components according to example embodiments of the present disclosure. For instance, the user interface 450 can display relaxed query sets based on the first query set specified in graphical user interface 400 of FIG. 4A. The relaxed query sets and/or connected components can be generated as discussed herein. The user interface 450 can include one or more relaxed query set display elements 464. The relaxed query set display elements 464 can display information about the relaxed query sets and/or corresponding connected components. For instance, the relaxed query set display elements 464 can include objective elements 466 that display information about (e.g., improvements to) one or more objectives with respect to the relaxed query sets, such as, for example, mileage or size of the connected components, number of lanes, etc. Additionally and/or alternatively, in some implementations, a user can interact with a particular relaxed query set display element 464 to select a selected display element 464 such that more information about a corresponding relaxed query set is displayed on the selected display element 464. For instance, in some implementations, a user clicking on or otherwise interacting with a relaxed query set display element 464 causes an attribute list, such as a drop down list, pop out list, or other list to be displayed that lists (e.g., relaxed) query criteria included in the corresponding query set, values of the (e.g., relaxed) query criteria, etc.

The connected graph display element 430 can additionally and/or alternatively be configured to display connected components and/or variations in connected components related to the relaxed query sets (e.g., in relaxed query set display elements 464). For instance, as illustrated in FIG. 4B, the connected graph display element can include additional lanes 472 (e.g., associated with the first relaxed query set) and 474 (e.g., associated with the second relaxed query set). The additional lanes 472 and 474 can be included in connected components resulting from at least one of the relaxed query sets and not included in the connected components resulting from the first query set. For instance, the additional lanes 472 and 474 can be added to the set of connected components resulting from the relaxed query set(s). The additional lanes 472, 474 can be visually distinguishable from lanes in the original connected components and/or sets of connected components other than their own by differing visual styles, such as different colors, thicknesses, dash styles, etc.

The user interface 450 can include a sort element 462. A user can interact with sort element 462 to sort the relaxed query set display elements 464 by any suitable criteria, such as, for example, objectives, alphanumeric identifier, etc. The user interface 450 can additionally and/or alternatively include an analysis element 468. A user can interact with the analysis element 468 to initiate and/or rerun query relaxation analysis as described herein, such as based on updated query criteria in the user interface 400 of FIG. 4A.

Figure 5:
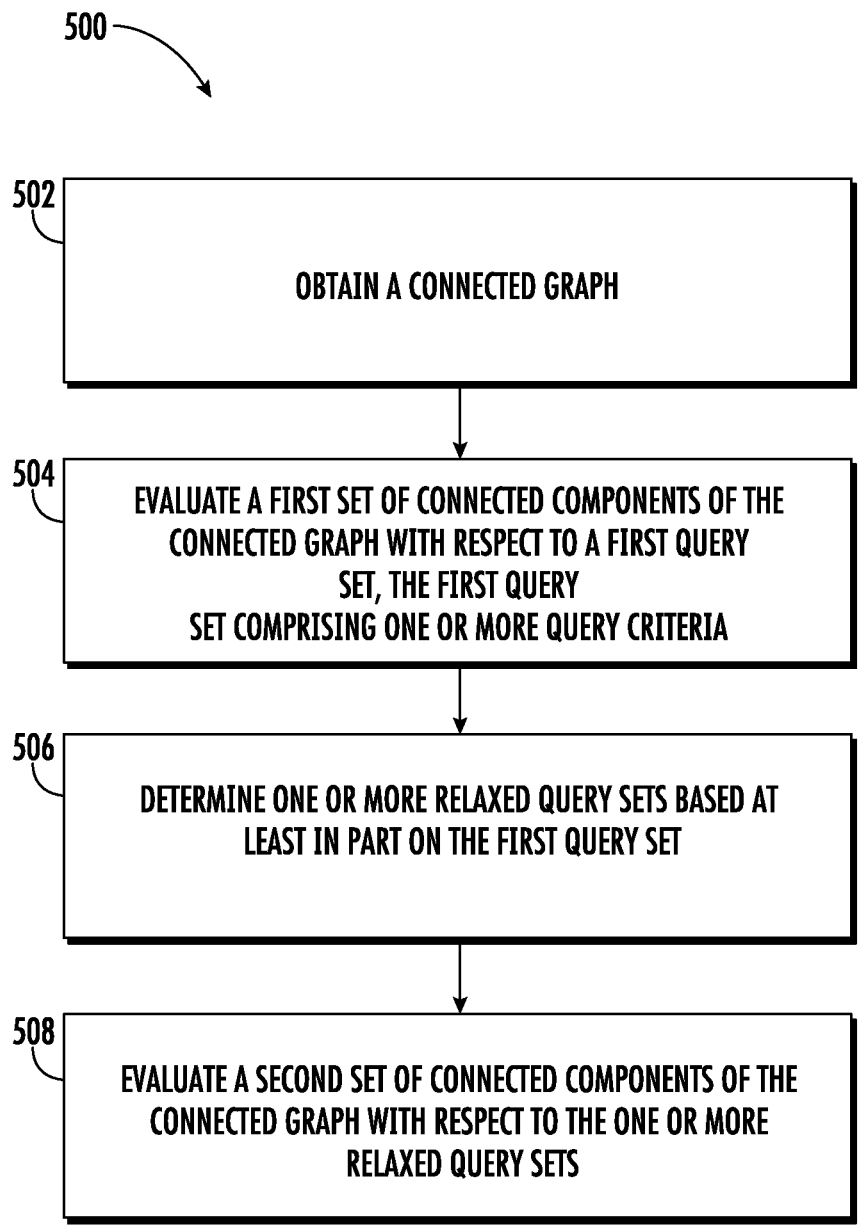
FIG. 5 depicts a flowchart diagram of an example method for relaxing queries on a queried connected graph according to example embodiments of the present disclosure.

FIG. 5 depicts a flow diagram of an example method 500 for relaxing queries on a queried connected graph according to example embodiments of the present disclosure. One or more portion(s) of the method 500 can be implemented by one or more computing devices such as, for example, the computing devices described in FIGS. 1, 2, 3, 7, and 8. Moreover, one or more portion(s) of the method 500 can be implemented as an algorithm on the hardware components of the device(s) described herein (e.g., as in FIGS. 1, 2, 3, 7, and 8) to, for example, relax queries on a queried connected graph. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include obtaining a connected graph. For instance, a computing system (e.g., service entity computing system 805) can obtain a connected graph. The connected graph can include a plurality of nodes and/or one or more edges. In some implementations, the connected graph can be or can include a lane map including one or more nodes corresponding to one or more lanes and one or more edges corresponding to connectiveness between the one or more lanes. For instance, in some implementations, the plurality of nodes can correspond to a plurality of lanes. Additionally and/or alternatively, the one or more edges can model connectivity between the plurality of lanes.

In some implementations, the plurality of nodes (e.g., the lanes) can include one or more attributes. The one or more attributes can define characteristics of the nodes (e.g., lanes). For instance, the one or more attributes of a node can define physical characteristics of a lane corresponding to the node. As example, the one or more attributes can include speed limit, number of traffic lanes, lane dimensions (e.g., width), gradient information (e.g., minimum gradient, maximum gradient, average gradient, etc.), usage type, presence of bus stops, bicycle lanes, street parking, or other infrastructure, lane direction, road type, number of intersections, and/or any other suitable attributes.

The connected graph can be queried (e.g., by connected component analysis) with respect to the attributes and one or more query criteria. For instance, connected component analysis can be performed to evaluate a set of connected components of the connected graph with respect to a given query set. The query set can be or can include a set of one or more query criteria or query conditions. The query criteria can define a criteria (e.g., one or more allowable values) for a respective attribute such that nodes satisfying (e.g., each of) the query criteria in a query set may be included in the connected components. For example, such as for numeric attributes (e.g., speed limit, gradient, etc.), the query criteria may define a threshold and/or range (e.g., minimum and/or maximum) of allowable values. As another example, such as for attributes having one or more values from a discrete list of values, the query criteria may define values from the discrete list that must be included and/or excluded from the attribute.

Example aspects of the present disclosure can provide for identifying relaxed query sets. The relaxed query set(s) can have one or more query conditions that are relaxed (e.g., broadened) compared to query conditions of a baseline query set. For instance, the method 500 can include, at 504, evaluating (e.g., by the computing system), a first set of connected components of the connected graph with respect to a first query set. The first query set can include one or more query criteria. For instance, in some implementations, the first query set can be a baseline query set. The baseline query set can represent a current state of query criteria. As one example, the baseline query set may represent a user-defined query including query criteria that are (e.g., manually) input by a user. For example, the baseline query set may represent current operational conditions (e.g., operational constraints) of an autonomous vehicle, such as a ridesharing autonomous vehicle. For example, the operational conditions may represent current performance and/or other operational capabilities of the autonomous vehicle.

As one example, in some implementations, a user may manually input or otherwise retrieve the first query set at a frontend component, such as a user interface. As one example, the front end can provide (e.g., by one or more user interface components) a user with the capability of inputting one or more query criteria. After the user has input the query criteria, the frontend component may provide the user with the capability of initiating connected component analysis based on the input query criteria (e.g., the first query set) to evaluate and/or display the connected components corresponding to the input query criteria. For instance, the frontend component may send a query relaxation request to a backend component (e.g., a server/database component) to instruct the backend component to evaluate the connected components. The query relaxation request may include the query criteria of the first query set. In some implementations, the relaxed query sets and/or the second set of connected components may be returned (e.g., from the backend to the frontend) in addition to the connected components corresponding to the first query set.

In some implementations, the computing system can identify one or more candidate relaxed query sets based at least in part on the first query set. For instance, in some implementations, the candidate relaxed query sets can be determined with respect to one or more relaxation parameters. The relaxation parameters can be, for example, specified by a user. As one example, a relaxation parameter can be a cardinality of relaxed query criteria. For instance, the one or more candidate relaxed query sets can be identified with respect to a cardinality of relaxed query criteria. The cardinality can specify a maximum number of query criteria to be relaxed. For instance, valid relaxed query sets having a number of relaxed query criteria that is less than and/or equal to the cardinality may be identified as candidate relaxed query sets. The cardinality can be established based on likely improvements to vehicle capabilities in a reasonable future time frame. For example, it may be unlikely that vehicle capabilities will improve at greater than some number of attributes in the near future, and the cardinality may be selected to trim the search space to query sets corresponding reasonable improvements in capabilities over the near future. In some implementations, the cardinality can be user-specified. For instance, the cardinality may be input by a user into a graphical user interface, such as a frontend component, and/or provided from a user in a query relaxation request to a backend component to instruct the backend component on a number of query criteria to relax. The use of a cardinality can additionally and/or alternatively prevent trivial or unhelpful solutions, such as a solution to relax all query criteria or some large number of query criteria, which may be practically infeasible.

Additionally and/or alternatively, the method 500 can include, at 506, determining (e.g., by the computing system) one or more relaxed query sets based at least in part on the first query set. The relaxed query set(s) can include one or more query criteria. For instance, the relaxed query set(s) can include at least one relaxed query criteria. The relaxed query criteria can be relaxed or broadened respective to the (e.g., baseline) query criteria of the first query set. For instance, at least one of the query criteria (e.g., the relaxed query criteria) of the relaxed query set(s) can be broader than a respective query criteria of the first query set. For example, a number of values satisfying a relaxed query criteria can be greater than a number of values satisfying a (e.g., baseline) query criteria of the first query set. In some implementations, one or more of the query criteria can be locked query criteria that are not allowed to vary between the first query set and the relaxed query set. For instance, in some implementations, a user can lock certain query criteria or attributes.

As one example, such as for numerical query criteria, a range of allowable values for the relaxed query criteria can be broader than a range for a baseline query criteria. For example, in some implementations, a (e.g., numerical) relaxed query criteria can differ from a baseline criteria by a (e.g., fixed) step size. Relaxing query conditions by a step size can provide for a deterministic manner for relaxing an otherwise larger range of potential relaxations, such as for numerical values. For instance, the step size can specify an amount by which numerical query conditions are to differ when relaxed. In some implementations, a user may specify the step size, such as in a query relaxation request to the backend.

As another example, the relaxed query set may include a greater number of allowed tags and/or a fewer number of restricted tags for tag or token-based query criteria. Additionally and/or alternatively, the allowable values for the relaxed query criteria may include some or all allowable values of the baseline query criteria. For instance, if a baseline query includes one allowable tag or label, a relaxed query may include two (or more) allowable tags or label, including the originally allowable tag or label. In some implementations, the number of and/or types of newly allowable tags or labels in a relaxed query criteria may be specified (e.g., by the user).

Additionally and/or alternatively, the method 500 can include, at 508, evaluating (e.g., by the computing system) a second set of connected components of the connected graph with respect to the one or more relaxed query sets. For instance, for each of the identified relaxed query sets, a second set of connected components can be generated based on the relaxed query criteria of the relaxed query sets. Generally, the second set of connected components will include at least one connected component that is enlarged compared to a corresponding connected component of the original set of connected components. Additionally and/or alternatively, the second set of connected components may provide for some connected components to merge. Additionally and/or alternatively, the second set of connected components can provide for new connected components to be formed from nodes that may not have previously been included in any connected component.

In implementations with multiple second sets of connected components, the multiple second sets of connected components can be evaluated from a single backend request (e.g., query relaxation requests) and/or multiple backend requests. For example, in some implementations, a single backend request can be provided to the backend, and the backend can generate a superset of all valid relaxed query sets and/or lanes. The supersets can then be filtered for the first query set and each relaxed query set. This approach can reduce computational overhead associated with providing the backend request, which can improve processing time in some cases. Additionally and/or alternatively, in some implementations, each backend request can provide a single relaxed query set and/or second set of connected components. For instance, each backend request can cause a second set of connected components and/or corresponding relaxed query set to be evaluated and/or stored, such as in a database.

As one example, in some implementations, the second set(s) of connected components can be evaluated by a so-called brute force technique. For instance, a second set of connected components can be evaluated for each valid relaxed query set (e.g., satisfying the desired cardinality). The most improved relaxed query set(s) and/or corresponding second sets of connected components may then be provided to a user.

Additionally and/or alternatively, in some implementations, improvement of some or all of the relaxed query sets can be scored by an approximation algorithm. For instance, in some implementations, determining the relaxed query sets can include identifying (e.g., by the computing system) one or more candidate relaxed query sets based at least in part on the first query set. For instance, in some implementations, the one or more candidate relaxed query sets can be or can include (e.g., each) query set that satisfies the cardinality of relaxed attributes. Determining the relaxed query sets can further include scoring (e.g., by the computing system) the one or more candidate relaxed query sets to produce one or more candidate scores relative to the one or more candidate relaxed query sets. For instance, the candidate scores can be indicative of an approximated objective (e.g., size) and/or increase in objective (e.g., a marginal increase) of a respective candidate relaxed query sets.

Mathematically, let Q' be a relaxation of an original query set Q. The original query set Q can include one or more query criteria q(l, $a_i$, $v_i$). The additional nodes enabled by this relaxation are $V^{Q'}$={l∈V\V (Q): q(l, $a_i$, $v_i$)=1∀i∈Q'}, e.g., the set of nodes filtered out by the original query but enabled by the relaxation. As used herein, let l denote a lane or node, let $a_i$ denote an attribute, and let $v_i$ denote a queried value.

As one example, in some implementations, the candidate score(s) can be or can include, for a respective candidate relaxed query set, a count of each node in the connected graph that is added to an existing connected component by querying according to the candidate relaxed query set. For instance, in some implementations, this score can be determined by determining a number of nodes that have predecessors or successors in a set including all new nodes provided by the candidate relaxed query sets $V^{Q'}$. For example, let p(l) and s(l) denote the set of predecessors and successors of node l. Then, this score can be expressed as:

$$s_1(Q') = \sum_{l \in V^{Q'}} \mathbb{1}[(p(l) \cup s(l)) \cap C_G(Q) \neq \emptyset]$$

Additionally and/or alternatively, in some implementations, the candidate score(s) can be or can include, for a respective candidate relaxed query set, a count of each node in the connected graph that forms a new connected component by querying according to the candidate relaxed query set. This score can be expressed as:

$$s_2(Q') = \sum_{l \in V^{Q'}} \mathbb{1}[(p(l) \cup s(l)) \cap V^{Q'} \neq \emptyset]$$

The candidate score(s) can, in some implementations, be a sum of these two counts. For instance, a candidate score can be expressed as:

$s(Q')=\alpha s_1(Q')/\beta s_2(Q')$ where $\alpha$ and $\beta$ denote scaling factors. This candidate score can positively correlate to size of the connected components, and can thus serve as a suitable approximation for identifying query relaxations that greatly increase a size objective of the connected components.

Determining the relaxed query sets can further include selecting (e.g., by the computing system) the one or more relaxed query sets from at least a subset of the one or more candidate relaxed query sets based at least in part on the one or more candidate scores. For instance, in some implementations, the relaxed query set(s) can be selected as a subset of candidate relaxed query sets having the highest candidate score(s). Once the subset is identified and selected, sets of connected components can be generated (e.g., only) for the selected subset.

In some implementations, the method 500 can additionally include providing for display (e.g., by a display device of the computing system) the second set of connected components and/or the relaxed query set(s). For example, in some implementations, the relaxed query criteria may be rendered in a list. If the user hovers over each list item, the second set of connected components corresponding to the relaxed query criteria (e.g., the added lanes) can be shown (e.g., highlighted) in a frontend component, such as a user interface, such as on a map.

Figure 6:
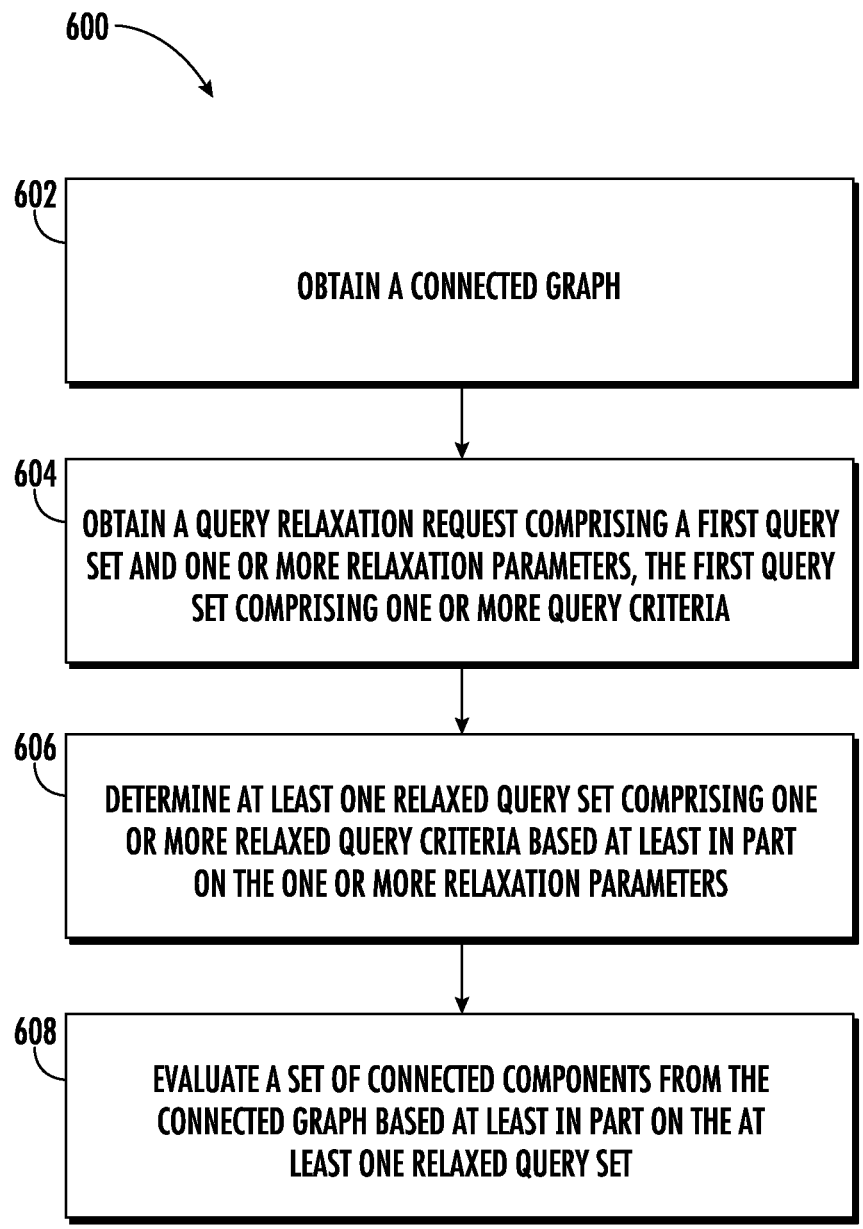
FIG. 6 depicts a flowchart diagram of an example method for relaxing queries on a queried connected graph according to example embodiments of the present disclosure.

FIG. 6 depicts a flow diagram of an example method 600 for relaxing queries on a queried connected graph according to example embodiments of the present disclosure. One or more portion(s) of the method 600 can be implemented by one or more computing devices such as, for example, the computing devices described in FIGS. 1, 2, 3, 7, and 8. Moreover, one or more portion(s) of the method 600 can be implemented as an algorithm on the hardware components of the device(s) described herein (e.g., as in FIGS. 1, 2, 3, 7, and 8) to, for example, relax queries on a queried connected graph. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (602), the method 600 can include obtaining a connected graph. For instance, a computing system (e.g., service entity computing system 805) can obtain a connected graph. The connected graph can include a plurality of nodes and/or one or more edges. In some implementations, the connected graph can be or can include a lane map including one or more nodes corresponding to one or more lanes and one or more edges corresponding to connectiveness between the one or more lanes. For instance, in some implementations, the plurality of nodes can correspond to a plurality of lanes. Additionally and/or alternatively, the one or more edges can model connectivity between the plurality of lanes.

In some implementations, the plurality of nodes (e.g., the lanes) can include one or more attributes. The one or more attributes can define characteristics of the nodes (e.g., lanes). For instance, the one or more attributes of a node can define physical characteristics of a lane corresponding to the node. As example, the one or more attributes can include speed limit, number of traffic lanes, lane dimensions (e.g., width), gradient information (e.g., minimum gradient, maximum gradient, average gradient, etc.), usage type, presence of bus stops, bicycle lanes, street parking, or other infrastructure, lane direction, road type, number of intersections, and/or any other suitable attributes.

Additionally and/or alternatively, the method 600 can include, at 604, obtaining (e.g., by the computing system) a query relaxation request including a first query set and one or more relaxation parameters. The first query set can include one or more query criteria. The first query set can include one or more query criteria. For instance, in some implementations, the first query set can be a baseline query set. The baseline query set can represent a current state of query criteria. As one example, the baseline query set may represent a user-defined query including query criteria that are (e.g., manually) input by a user. For example, the baseline query set may represent current operational conditions (e.g., operational constraints) of an autonomous vehicle, such as a ridesharing autonomous vehicle. For example, the operational conditions may represent current performance and/or other operational capabilities of the autonomous vehicle.

As one example, in some implementations, a user may manually input or otherwise retrieve the first query set at a frontend component, such as a user interface. As one example, the front end can provide (e.g., by one or more user interface components) a user with the capability of inputting one or more query criteria. After the user has input the query criteria, the frontend component may provide the user with the capability of initiating connected component analysis based on the input query criteria (e.g., the first query set) to evaluate and/or display the connected components corresponding to the input query criteria. For instance, the frontend component may send a query relaxation request to a backend component (e.g., a server/database component) to instruct the backend component to evaluate the connected components. The query relaxation request may include the query criteria of the first query set. In some implementations, the relaxed query sets and/or the second set of connected components may be returned (e.g., from the backend to the frontend) in addition to the connected components corresponding to the first query set.

In some implementations, the one or more relaxation parameters can include a cardinality of relaxed query criteria. For instance, the one or more candidate relaxed query sets can be identified with respect to the cardinality of relaxed query criteria. The cardinality can specify a maximum number of query criteria to be relaxed. For instance, valid relaxed query sets having a number of relaxed query criteria that is less than and/or equal to the cardinality may be identified as candidate relaxed query sets. The cardinality can be established based on likely improvements to vehicle capabilities in a reasonable future time frame. For example, it may be unlikely that vehicle capabilities will improve at greater than some number of attributes in the near future, and the cardinality may be selected to trim the search space to query sets corresponding reasonable improvements in capabilities over the near future. In some implementations, the cardinality can be user-specified. For instance, the cardinality may be input by a user into a graphical user interface, such as a frontend component, and/or provided from a user in a query relaxation request to a backend component to instruct the backend component on a number of query criteria to relax. The use of a cardinality can additionally and/or alternatively prevent trivial or unhelpful solutions, such as a solution to relax all query criteria or some large number of query criteria, which may be practically infeasible.

Additionally and/or alternatively, the method 600 can include, at 606, determining (e.g., by the computing system) at least one relaxed query set based at least in part on the first query set. The relaxed query set(s) can include one or more query criteria. For instance, the relaxed query set(s) can include at least one relaxed query criteria. The relaxed query criteria can be relaxed or broadened respective to the (e.g., baseline) query criteria of the first query set. For instance, at least one of the query criteria (e.g., the relaxed query criteria) of the relaxed query set(s) can be broader than a respective query criteria of the first query set. For example, a number of values satisfying a relaxed query criteria can be greater than a number of values satisfying a (e.g., baseline) query criteria of the first query set. In some implementations, one or more of the query criteria can be locked query criteria that are not allowed to vary between the first query set and the relaxed query set. For instance, in some implementations, a user can lock certain query criteria or attributes.

As one example, such as for numerical query criteria, a range of allowable values for the relaxed query criteria can be broader than a range for a baseline query criteria. For example, in some implementations, a (e.g., numerical) relaxed query criteria can differ from a baseline criteria by a (e.g., fixed) step size. Relaxing query conditions by a step size can provide for a deterministic manner for relaxing an otherwise larger range of potential relaxations, such as for numerical values. For instance, the step size can specify an amount by which numerical query conditions are to differ when relaxed. In some implementations, a user may specify the step size, such as in a query relaxation request to the backend.

As another example, the relaxed query set may include a greater number of allowed tags and/or a fewer number of restricted tags for tag or token-based query criteria. Additionally and/or alternatively, the allowable values for the relaxed query criteria may include some or all allowable values of the baseline query criteria. For instance, if a baseline query includes one allowable tag or label, a relaxed query may include two (or more) allowable tags or label, including the originally allowable tag or label. In some implementations, the number of and/or types of newly allowable tags or labels in a relaxed query criteria may be specified (e.g., by the user).

Additionally and/or alternatively, the method 600 can include, at 608, evaluating (e.g., by the computing system) a second set of connected components of the connected graph with respect to the at least one relaxed query set. For instance, for each of the identified relaxed query sets, a second set of connected components can be generated based on the relaxed query criteria of the relaxed query sets. Generally, the second set of connected components will include at least one connected component that is enlarged compared to a corresponding connected component of the original set of connected components. Additionally and/or alternatively, the second set of connected components may provide for some connected components to merge. Additionally and/or alternatively, the second set of connected components can provide for new connected components to be formed from nodes that may not have previously been included in any connected component.

In implementations with multiple second sets of connected components, the multiple second sets of connected components can be evaluated from a single backend request (e.g., query relaxation requests) and/or multiple backend requests. For example, in some implementations, a single backend request can be provided to the backend, and the backend can generate a superset of all valid relaxed query sets and/or lanes. The supersets can then be filtered for the first query set and each relaxed query set. This approach can reduce computational overhead associated with providing the backend request, which can improve processing time in some cases. Additionally and/or alternatively, in some implementations, each backend request can provide a single relaxed query set and/or second set of connected components. For instance, each backend request can cause a second set of connected components and/or corresponding relaxed query set to be evaluated and/or stored, such as in a database.

As one example, in some implementations, the second set(s) of connected components can be evaluated by a so-called brute force technique. For instance, a second set of connected components can be evaluated for each valid relaxed query set (e.g., satisfying the desired cardinality). The most improved relaxed query set(s) and/or corresponding second sets of connected components may then be provided to a user.

Additionally and/or alternatively, in some implementations, improvement of some or all of the relaxed query sets can be scored by an approximation algorithm. For instance, in some implementations, determining the relaxed query sets can include identifying (e.g., by the computing system) one or more candidate relaxed query sets based at least in part on the first query set. For instance, in some implementations, the one or more candidate relaxed query sets can be or can include (e.g., each) query set that satisfies the cardinality of relaxed attributes. Determining the relaxed query sets can further include scoring (e.g., by the computing system) the one or more candidate relaxed query sets to produce one or more candidate scores relative to the one or more candidate relaxed query sets. For instance, the candidate scores can be indicative of an approximated objective (e.g., size) and/or increase in objective (e.g., a marginal increase) of a respective candidate relaxed query sets.

Mathematically, let $Q'$ be a relaxation of an original query set $Q$. The original query set $Q$ can include one or more query criteria $q(l, a_i, v_i)$. The additional nodes enabled by this relaxation are $V^{Q'}=\{l \in V \backslash V(Q): q(l, a_i, v_i)=1 \forall i \in Q'\}$, e.g., the set of nodes filtered out by the original query but enabled by the relaxation. As used herein, let l denote a lane or node, let $a_i$ denote an attribute, and let $v_i$ denote a queried value.

As one example, in some implementations, the candidate score(s) can be or can include, for a respective candidate relaxed query set, a count of each node in the connected graph that is added to an existing connected component by querying according to the candidate relaxed query set. For instance, in some implementations, this score can be determined by determining a number of nodes that have predecessors or successors in a set including all new nodes provided by the candidate relaxed query sets $V^{Q'}$. For example, let $p(l)$ and $s(l)$ denote the set of predecessors and successors of node l. Then, this score can be expressed as:

$$s_1(Q') = \sum_{l \in V^{Q'}} \mathbb{1}[(p(l) \cup s(l)) \cap C_G(Q) \neq \emptyset]$$

Additionally and/or alternatively, in some implementations, the candidate score(s) can be or can include, for a respective candidate relaxed query set, a count of each node in the connected graph that forms a new connected component by querying according to the candidate relaxed query set. This score can be expressed as:

$$s_2(Q') = \sum_{l \in V^{Q'}} \mathbb{1}[(p(l) \cup s(l)) \cap V^{Q'} \neq \emptyset]$$

The candidate score(s) can, in some implementations, be a sum of these two counts. For instance, a candidate score can be expressed as:

$$s(Q') = \alpha s_1(Q') + \beta s_2(Q')$$

where $\alpha$ and $\beta$ denote scaling factors. This candidate score can positively correlate to size of the connected components, and can thus serve as a suitable approximation for identifying query relaxations that greatly increase a size objective of the connected components.

Determining the relaxed query sets can further include selecting (e.g., by the computing system) the at least one relaxed query set from at least a subset of the one or more candidate relaxed query sets based at least in part on the one or more candidate scores. For instance, in some implementations, the relaxed query set(s) can be selected as a subset of candidate relaxed query sets having the highest candidate score(s). Once the subset is identified and selected, sets of connected components can be generated (e.g., only) for the selected subset.

In some implementations, the method 600 can additionally include providing for display (e.g., by a display device of the computing system) the second set of connected components and/or the relaxed query set(s). For example, in some implementations, the relaxed query criteria may be rendered in a list. If the user hovers over each list item, the second set of connected components corresponding to the relaxed query criteria (e.g., the added lanes) can be shown (e.g., highlighted) in a frontend component, such as a user interface, such as on a map.

Figure 7:
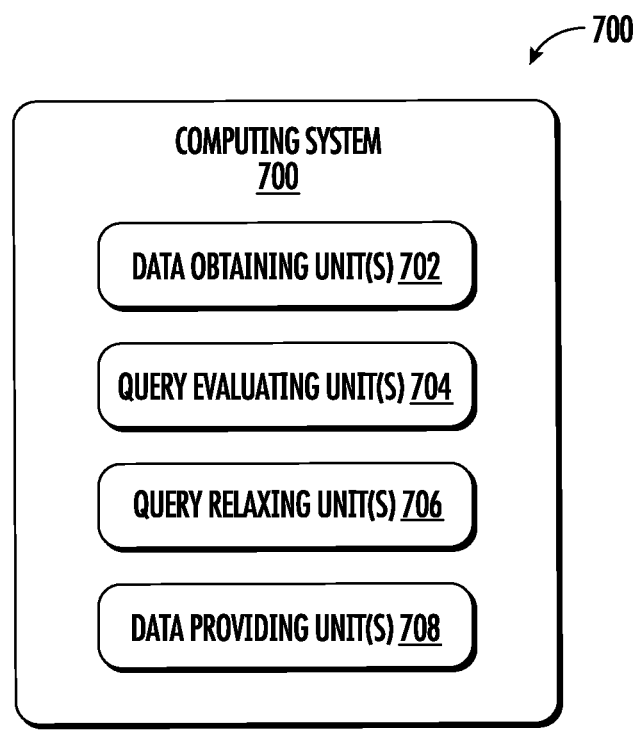
FIG. 7 depicts example units associated with a computing system for performing operations and functions according to example embodiments of the present disclosure.

Various means can be configured to perform the methods and processes described herein. FIG. 7 depicts example units associated with a computing system for performing operations and functions according to example embodiments of the present disclosure. As depicted, FIG. 7 depicts a computing system 700 that can include, but is not limited to, data obtaining unit(s) 702, query evaluating unit(s) 704, query relaxing unit(s) 706, data providing unit(s) 708, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s) 702, etc.) can be configured to obtain a connected graph. For instance, the connected graph can include a lane map having one or more nodes corresponding to one or more lanes and one or more edges corresponding to connectiveness between the one or more lanes. Additionally and/or alternatively, the means (e.g., query evaluating unit(s) 704, etc.) can be configured to evaluate a first set of connected components of the connected graph with respect to a first query set. The first query set can include one or more query criteria.

The means (e.g., query relaxing unit(s) 706, etc.) can be configured to a obtain query relaxation request comprising a first query set and one or more relaxation parameters, the first query set comprising one or more query criteria. Additionally and/or alternatively, the means (e.g., query relaxing unit(s) 706, etc.) can be configured to determine one or more relaxed query sets based at least in part on the first query set. Additionally and/or alternatively, the means (e.g., query evaluating unit(s) 704, etc.) can evaluate a second set of connected components of the connected graph with respect to the one or more relaxed query sets.

The means (e.g., data providing unit(s) 708, etc.) can provide data such as the first query set, the first set of connected components, the one or more relaxed query sets, and/or the second set of components. For instance, the means (e.g., data providing unit(s) 708, etc.) can provide the data for display (e.g., via a display device).

Figure 8:
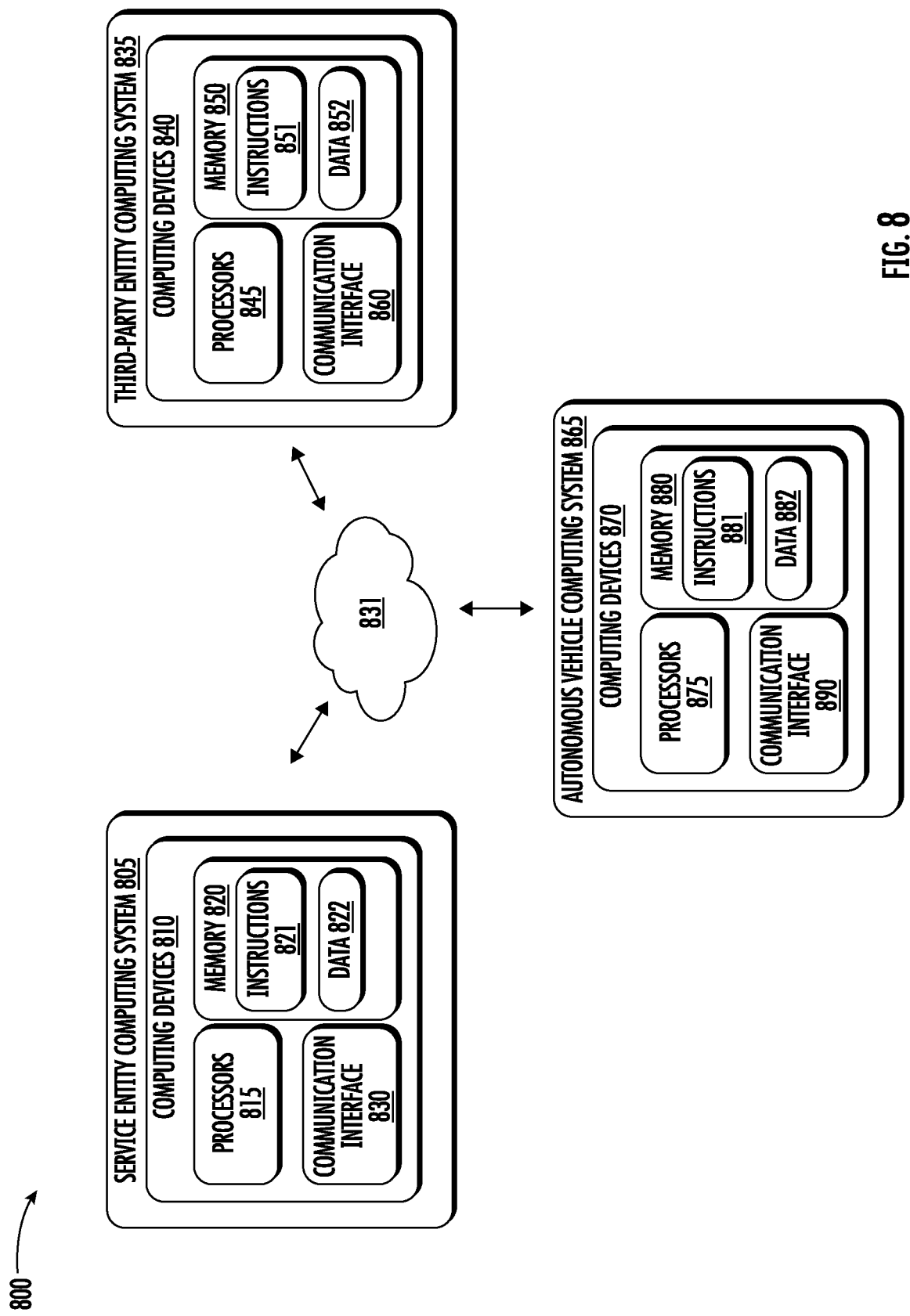
FIG. 8 depicts an example system according to example aspects of the present disclosure.

FIG. 8 depicts an example system 800 according to example aspects of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a service entity computing system 805 (e.g., that is associated with a service entity). The example system 800 can include a third-party entity computing system 835 (e.g., that is associated with a third-party entity). The example system 800 can include an autonomous vehicle computing system 865 (e.g., that is onboard an autonomous vehicle). The autonomous vehicle computing system 865 can represent/correspond to the autonomous vehicle computing system 110 described herein. The service entity computing system 805, the third-party entity computing system 835, and the autonomous vehicle computing system 865 can be communicatively coupled to one another over one or more communication network(s) 831. The networks 831 can correspond to any of the networks described herein, such as communication network 120.

The computing device(s) 810 of the service entity computing system 805 can include processor(s) 815 and a memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, data registrar, etc., and combinations thereof.

The memory 820 can store information that can be accessed by the one or more processors 815. For example, the memory 820 (e.g., one or more non-transitory computer-readable storage mediums, memory devices) can include computer-readable instructions 821 that can be executed by the one or more processors 815. The instructions 821 can be software written in any suitable programming language or can be implemented in hardware. Additionally, or alternatively, the instructions 821 can be executed in logically and/or virtually separate threads on processor(s) 815.

For example, the memory 820 can store instructions 821 that when executed by the one or more processors 815 cause the one or more processors 815 (the service entity computing system 805) to perform operations such as any of the operations and functions of the service entity computing system (or for which it is configured), one or more of the operations and functions for communicating between a third-party entity and/or a service entity and/or an autonomous vehicle, one or more portions of methods 500 or 600, and/or one or more of the other operations and functions of the computing systems described herein.

The memory 820 can store data 822 that can be obtained (e.g., acquired, received, retrieved, accessed, created, stored, etc.). The data 822 can include, for example, data associated with communications (e.g., messages, calls, callbacks, etc.), data associated with software package(s) (e.g., Cloud SDK data), data associated with one or more backends/services, data associated with APIs, batched data, data associated with autonomous vehicles, data associated with third-party entities, sensor data, map data, vehicle state data, vehicle location data, perception data, prediction data, motion planning data, data associated with a vehicle client, data associated with a communication network, data associated with a library, data associated with user interfaces, data associated with user input, data associated with queries, data associated with constraints, data associated with relaxed queries, data associated with operational domains for vehicles, data associated with geofences, data associated with vehicle autonomy capabilities, and/or other data/information such as, for example, that described herein. In some implementations, the computing device(s) 810 can obtain data from one or more memories that are remote from the service entity computing system 805.

The computing device(s) 810 can also include a communication interface 830 used to communicate with one or more other system(s) on-board an autonomous vehicle and/or remote from the service entity computing system, such as third-party entity computing system 835 and an autonomous vehicle computing system 865. The communication interface 830 can include any circuits, components, software, etc. for communicating via one or more networks (e.g., network(s) 831). The communication interface 830 can include, for example, one or more of a communications controller, receiver, transceiver, transmitter, port, conductors, software and/or hardware for communicating data.

The third-party entity computing system 835 can include one or more computing device(s) 840 that are remote from the service entity computing system 805 and/or the autonomous vehicle computing system 865. The computing device(s) 840 can include one or more processors 845 and a memory 850. The one or more processors 845 can be any suitable processing device (e.g., a processor core, a microprocessor, an ASIC, a FPGA, a controller, a microcontroller, etc.) and can be one processor or a plurality of processors that are operatively connected. The memory 850 can include one or more tangible, non-transitory computer-readable storage media, such as RAM, ROM, EEPROM, EPROM, one or more memory devices, flash memory devices, data registrar, etc., and combinations thereof.

The memory 850 can store information that can be accessed by the one or more processors 845. For example, the memory 850 (e.g., one or more tangible, non-transitory computer-readable storage media, one or more memory devices, etc.) can include computer-readable instructions 851 that can be executed by the one or more processors 845. The instructions 851 can be software written in any suitable programming language or can be implemented in hardware. Additionally, or alternatively, the instructions 851 can be executed in logically and/or virtually separate threads on processor(s) 845.

For example, the memory 850 can store instructions 851 that when executed by the one or more processors 845 cause the one or more processors 845 to perform operations such as any of the operations and functions of the third-party entity computing system (or for which it is configured), one or more of the operations and functions for communicating between a third-party entity and/or a service entity and/or an autonomous vehicle, one or more portions of methods 500 or 600, and/or one or more of the other operations and functions of the computing systems described herein.

The memory 850 can store data 852 that can be obtained. The data 852 can include, for example, data associated with communications (e.g., messages, calls, callbacks, etc.), data associated with software package(s) (e.g., Cloud SDK data), data associated with one or more backends, data associated with APIs, batched data, data associated with autonomous vehicles (e.g. of the third party's fleet, etc.), data associated with third-party entities, sensor data, map data, vehicle state data, vehicle location data, perception data, prediction data, motion planning data, data associated with a vehicle client, data associated with a communication network, data associated with user interfaces, data associated with user input, data associated with queries, data associated with queries, data associated with constraints, data associated with relaxed queries, data associated with operational domains for vehicles, data associated with geofences, data associated with vehicle autonomy capabilities, and/or other data/information such as, for example, that described herein.

The computing device(s) 840 can also include a communication interface 860 used to communicate with one or more system(s) onboard an autonomous vehicle and/or another computing device that is remote from the system 835, such as autonomous vehicle computing system 865 and service entity computing system 805. The communication interface 860 can include any circuits, components, software, etc. for communicating via one or more networks (e.g., network(s) 831). The communication interface 860 can include, for example, one or more of a communications controller, receiver, transceiver, transmitter, port, conductors, software and/or hardware for communicating data.

The autonomous vehicle computing system 865 can include one or more computing device(s) 870 that are remote from the service entity computing system 805 and the third-party entity computing system 835. The computing device(s) 870 can include one or more processors 875 and a memory 880. The one or more processors 875 can be any suitable processing device (e.g., a processor core, a microprocessor, an ASIC, a FPGA, a controller, a microcontroller, etc.) and can be one processor or a plurality of processors that are operatively connected. The memory 880 can include one or more tangible, non-transitory computer-readable storage media, such as RAM, ROM, EEPROM, EPROM, one or more memory devices, flash memory devices, data registrar, etc., and combinations thereof.

The memory 880 can store information that can be accessed by the one or more processors 875. For example, the memory 880 (e.g., one or more tangible, non-transitory computer-readable storage media, one or more memory devices, etc.) can include computer-readable instructions 881 that can be executed by the one or more processors 875. The instructions 881 can be software written in any suitable programming language or can be implemented in hardware. Additionally, or alternatively, the instructions 881 can be executed in logically and/or virtually separate threads on processor(s) 875.

For example, the memory 880 can store instructions 881 that when executed by the one or more processors 875 cause the one or more processors 875 to perform operations such as any of the operations and functions of the autonomous vehicle computing system (or for which it is configured), one or more of the operations and functions for communicating between a third-party entity and/or a service entity and/or an autonomous vehicle, one or more portions of methods 500 or 600, and/or one or more of the other operations and functions of the computing systems described herein.

The memory 880 can store data 882 that can be obtained. The data 882 can include, for example, data associated with communications (e.g., messages, calls, callbacks, etc.), data associated with software package(s) (e.g., Cloud SDK data), data associated with one or more backends (e.g., remote assistance commands, routing instructions, etc.), data associated with APIs, batched data, sensor data, map data, vehicle state data, vehicle location data, perception data, prediction data, motion planning data, data associated with a vehicle client, data associated with a telecommunication network, data associated with user interfaces, data associated with user input, data associated with operational domains, and/or other data/information such as, for example, that described herein.

The computing device(s) 870 can also include a communication interface 890 used to communicate with one or more system(s) onboard a vehicle and/or another computing device that is remote from the system 865, such as third-party entity computing system 835 and/or service entity computing system 805. The communication interface 890 can include any circuits, components, software, etc. for communicating via one or more networks (e.g., network(s) 831). The communication interface 890 can include, for example, one or more of a communications controller, receiver, transceiver, transmitter, port, conductors, software and/or hardware for communicating data.

The network(s) 831 can be any type of network or combination of networks that allows for communication between devices. In some implementations, the network(s) 831 can include one or more of a local area network, wide area network, the Internet, secure network, cellular network, mesh network, peer-to-peer communication link and/or some combination thereof and can include any number of wired or wireless links. Communication over the network(s) 831 can be accomplished, for example, via a communication interface using any type of protocol, protection scheme, encoding, format, packaging, etc.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for relaxing queries on a queried connection graph, the method comprising:
    obtaining, by a computing system comprising one or more computing devices, a connected graph representing a lane map comprising navigable road segments within a geographic area;
    evaluating, by the computing system, a first set of connected components of the connected graph with respect to a first query set, the first query set comprising one or more query criteria, the one or more query criteria comprising one or more operational constraints associated with operating an autonomous vehicle within the geographic area;
    determining, by the computing system, one or more relaxed query sets based at least in part on the first query set, the one or more relaxed query sets allows for an increased number of values satisfying the one or more relaxed query sets compared to respective query criteria of the first query set by modifying at least one operational constraint, the one or more relaxed query sets including a count of connected nodes in the connected graph representing available route segments;
    evaluating, by the computing system, a second set of connected components of the connected graph with respect to the one or more relaxed query sets based on the count of connected nodes in the connected graph to identify an expanded set of available route segments, the connected graph being associated with autonomous vehicle operation within the geographic area;
    generating, by the computing system, an optimized navigation route for the autonomous vehicle based on the expanded set of available route segments identified from the second set of connected components; and
    causing, by the computing system, the autonomous vehicle to initiate navigation of the optimized navigation route within the geographic area by controlling one or more vehicle systems of the autonomous vehicle based on the second set of connected components.

2. The computer-implemented method of claim 1, wherein the connected graph comprises a lane map comprising one or more nodes corresponding to one or more lanes and one or more edges corresponding to connectiveness between the one or more lanes.

3. The computer-implemented method of claim 1, wherein the computer-implemented method is implemented at least in part by a backend component.

4. The computer-implemented method of claim 1, further comprising displaying, by the computing system, the second set of connected components.

5. The computer-implemented method of claim 1, wherein determining the one or more relaxed query sets comprises:
    identifying, by the computing system, one or more candidate relaxed query sets based at least in part on the first query set;
    scoring, by the computing system, the one or more candidate relaxed query sets to produce one or more candidate scores relative to the one or more candidate relaxed query sets; and
    selecting, by the computing system, the one or more relaxed query sets from at least a subset of the one or more candidate relaxed query sets based at least in part on the one or more candidate scores.

6. The computer-implemented method of claim 5, wherein the one or more relaxed query sets are selected from at least the subset of the one or more candidate relaxed query sets having a highest candidate score.

7. The computer-implemented method of claim 5, wherein the one or more candidate relaxed query sets are identified with respect to a cardinality of relaxed query criteria, the cardinality specifying a maximum number of query criteria to be relaxed.

8. The computer-implemented method of claim 5, wherein the one or more candidate relaxed query sets are relaxed based at least in part on a step size.

9. The computer-implemented method of claim 5, wherein the one or more candidate scores are based at least in part on an increased number of elements of sets of connected components evaluated from the connected graph with respect to the one or more relaxed query sets.

10. The computer-implemented method of claim 9, wherein the increased number of elements comprise nodes included in the sets of connected components.

11. The computer-implemented method of claim 9, wherein the increased number of elements comprise connected components.

12. A computer-implemented method for relaxing queries on a queried connection graph, the computer-implemented method comprising:
    obtaining, at a computing system comprising one or more computing devices, a connected graph representing a lane map comprising navigable road segments within a geographic area;
    obtaining, by the computing system, a query relaxation request comprising a first query set and one or more relaxation parameters, the first query set comprising one or more query criteria comprising one or more operational constraints associated with operating an autonomous vehicle within the geographic area;
    determining, by the computing system, at least one relaxed query set comprising one or more relaxed query criteria based at least in part on the one or more relaxation parameters, the at least one relaxed query set allowing for an increased number of values satisfying at least one relaxed query set compared to respective query criteria of the first query set by modifying at least one operational constraint, the at least one relaxed query set including a count of connected nodes in the connected graph representing available route segments;
    evaluating, by the computing system, a set of connected components from the connected graph based at least in part on the at least one relaxed query set based on the count of connected nodes in the connected graph to identify an expanded set of available route segments, the connected graph being associated with autonomous vehicle operation within the geographic area;
    generating, by the computing system, an optimized navigation route for the autonomous vehicle based on the expanded set of available route segments identified from the set of connected components; and
    causing, by the computing system, the autonomous vehicle to initiate navigation of the optimized navigation route within the geographic area by controlling one or more vehicle systems of the autonomous vehicle based on the set of connected components.

13. The computer-implemented method of claim 12, wherein the one or more relaxation parameters comprise a cardinality of relaxed query criteria.

14. The computer-implemented method of claim 12, wherein the connected graph comprises a lane map comprising one or more nodes corresponding to one or more lanes and one or more edges corresponding to connectiveness between the one or more lanes.

15. The computer-implemented method of claim 12, further comprising providing, by the computing system for display via a display device, data indicative of the set of connected components.

16. The computer-implemented method of claim 12, wherein determining the at least one relaxed query set comprises:
- identifying, by the computing system, one or more candidate relaxed query sets based at least in part on the first query set and the one or more relaxation parameters;
- scoring, by the computing system, the one or more candidate relaxed query sets to produce one or more candidate scores relative to the one or more candidate relaxed query sets; and
- selecting, by the computing system, at least one relaxed query set from at least a subset of the one or more candidate relaxed query sets based at least in part on the one or more candidate scores.

17. The computer-implemented method of claim 16, wherein the one or more candidate scores are based at least in part on an increased number of elements of sets of connected components evaluated from the connected graph with respect to the one or more candidate relaxed query sets.

18. The computer-implemented method of claim 12, wherein the at least one relaxed query set is selected with respect to an objective.

19. The computer-implemented method of claim 18, wherein the objective comprises a total mileage of the set of connected components.

20. A computing system configured for relaxing queries on a queried connected graph, the computing system comprising:
- one or more processors; and
- one or more memory devices storing computer-readable instructions that, when implemented, cause the one or more processors to perform operations for relaxing queries on a queried connected graph, the operations comprising:
  - obtaining a connected graph representing a lane map comprising navigable road segments within a geographic area;
  - evaluating a first set of connected components of the connected graph with respect to a first query set, the first query set comprising one or more query criteria, the one or more query criteria comprising one or more operational constraints associated with operating an autonomous vehicle within the geographic area;
  - determining one or more relaxed query sets based at least in part on the first query set, the one or more relaxed query sets allows for an increased number of values satisfying the one or more relaxed query sets compared to respective query criteria of the first query set by modifying at least one operational constraint, the one or more relaxed query sets including a count of connected nodes in the connected graph representing available route segments;
  - evaluating a second set of connected components of the connected graph with respect to the one or more relaxed query sets based on the count of connected nodes in the connected graph to identify an expanded set of available route segments;
  - generating an optimized vehicle path for an autonomous vehicle based on the expanded set of available route segments identified from the second set of connected components corresponding to the one or more relaxed query sets; and
  - causing, by the computing system, the autonomous vehicle to initiate navigation of the optimized vehicle path within the geographic area by controlling one or more vehicle systems of the autonomous vehicle based on the second set of connected components.

* * * * *